(12) United States Patent
Hayashi et al.

(10) Patent No.: US 8,760,989 B2
(45) Date of Patent: Jun. 24, 2014

(54) OBJECTIVE LENS ELEMENT

(75) Inventors: Katsuhiko Hayashi, Nara (JP);
Yasuhiro Tanaka, Hyogo (JP);
Michihiro Yamagata, Osaka (JP);
Yoshiaki Komma, Osaka (JP);
Kazuhiko Ishimaru, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 195 days.

(21) Appl. No.: 13/414,724

(22) Filed: Mar. 8, 2012

(65) Prior Publication Data

US 2012/0170122 A1 Jul. 5, 2012

Related U.S. Application Data

(63) Continuation of application No. PCT/JP2010/005694, filed on Sep. 17, 2010.

(30) Foreign Application Priority Data

Sep. 17, 2009 (JP) ................................ 2009-216223

(51) Int. Cl.
*G11B 7/00* (2006.01)

(52) U.S. Cl.
USPC ................................ 369/112.23; 369/112.08

(58) Field of Classification Search
None
See application file for complete search history.

(56) References Cited

U.S. PATENT DOCUMENTS

| | | | |
|---|---|---|---|
| 2002/0064120 A1* | 5/2002 | Saito et al. | 369/109.01 |
| 2004/0223442 A1* | 11/2004 | Koike et al. | 369/112.08 |
| 2004/0264343 A1* | 12/2004 | Hendriks et al. | 369/112.23 |
| 2005/0007935 A1* | 1/2005 | Sugi | 369/112.23 |
| 2006/0001934 A1* | 1/2006 | Hayashi | 359/6 |
| 2006/0002279 A1* | 1/2006 | Okamura | 369/112.23 |
| 2006/0077568 A1* | 4/2006 | Okamura et al. | 359/742 |
| 2009/0257338 A1* | 10/2009 | Ueda et al. | 369/112.23 |
| 2009/0323482 A1* | 12/2009 | Nakanuma | 369/44.23 |
| 2010/0322060 A1* | 12/2010 | Yasui | 369/112.03 |

FOREIGN PATENT DOCUMENTS

| | | |
|---|---|---|
| JP | H10-334504 A | 12/1998 |
| JP | 2004-071134 A | 3/2004 |
| JP | 2004-281034 A | 10/2004 |
| JP | 2006-209934 A | 8/2006 |
| JP | 2009-009674 A | 1/2009 |
| WO | 2009-016847 A1 | 2/2009 |

OTHER PUBLICATIONS

Ryuichi Katayama et al., "Blue/DVD/CD Compatible Optical Head with Three Wavelengths and a Wavelength Selective Filter," International Symposium on Optical Memory 2001, Oct. 16-19, 2001, pp. 30-31, Taipei Taiwan.

* cited by examiner

*Primary Examiner* — Thang Tran
(74) *Attorney, Agent, or Firm* — Judge Patent Associates

(57) ABSTRACT

An objective lens element which has excellent compatibility with optical discs having different base material thicknesses is provided. An objective lens element 141 has optically functional surfaces on an incident side and an exit side. Either one of the optically functional surfaces is divided into an inner part 131B including a rotational symmetry axis and an outer part 131F which is a ring-shaped region surrounding the inner part 131B. On the inner part 131B, a plurality of discontinuous steps are provided. The plurality of steps change in height in the same direction from the optical axis toward the outer part, and each of the steps causes a constant optical path difference longer than the wavelength $\lambda_1$ to the first incident light beam 61 and causes a constant optical path difference shorter than the wavelength $\lambda_2$ to the second incident light beam 62.

8 Claims, 21 Drawing Sheets

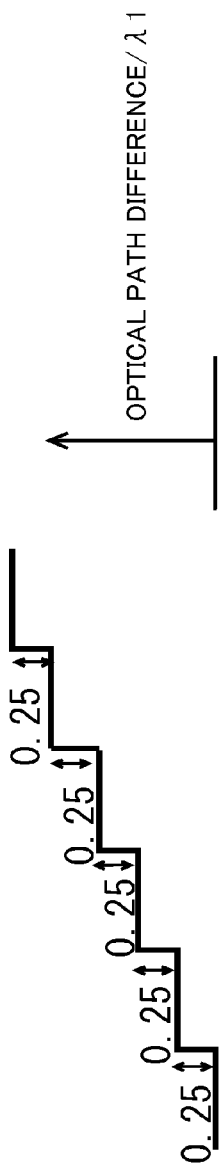
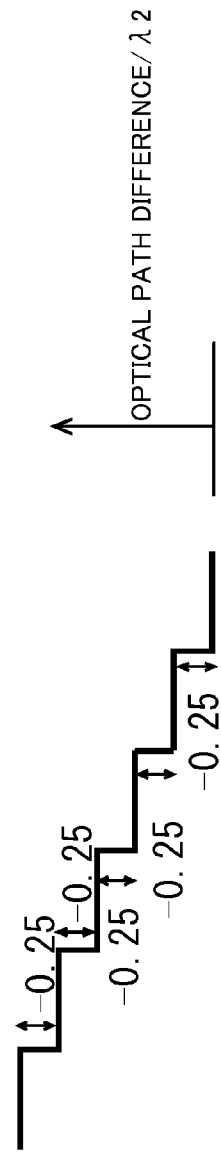

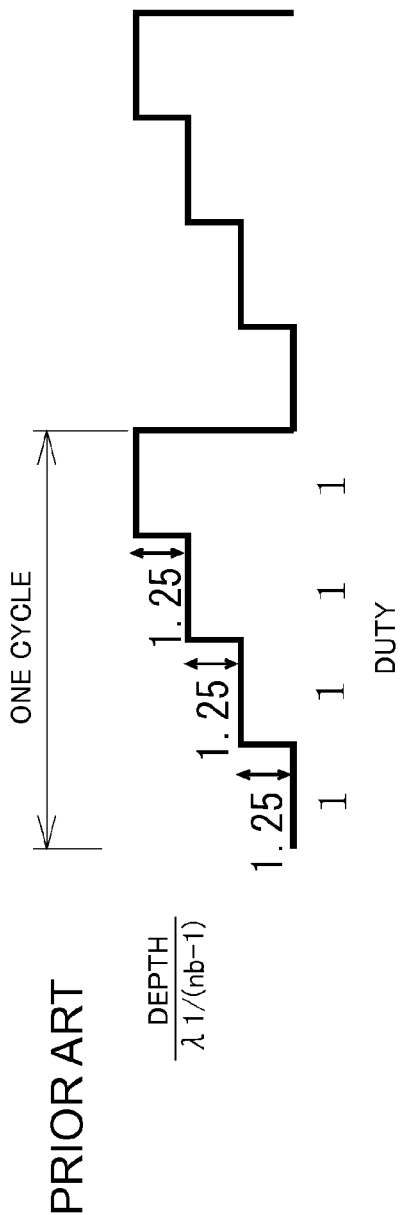
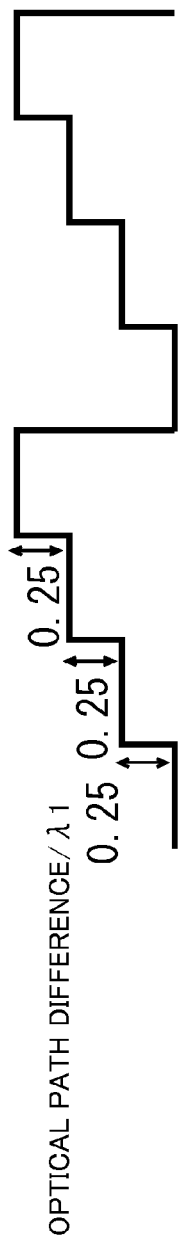
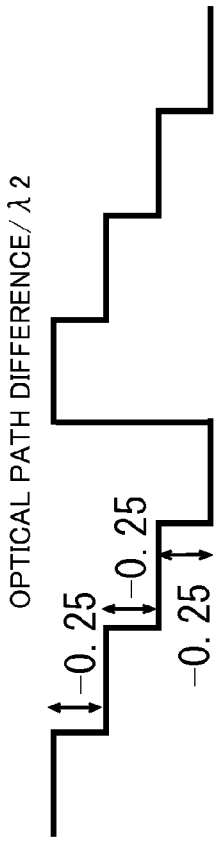
FIG. 23A PRIOR ART
FIG. 23B PRIOR ART
FIG. 23C PRIOR ART

OBJECTIVE LENS ELEMENT

CROSS-REFERENCE TO RELATED APPLICATION

This application is a U.S. continuation application filed under 35 USC 111A claiming benefit under 35 USC 120 and 365C of PCT application JP2010/005694, filed Sep. 17, 2010, which claims priority to Japanese Patent Application No. 2009-216223, filed on Sep. 17, 2009. The foregoing applications are hereby incorporated herein by reference.

BACKGROUND OF THE INVENTION

1. Field of the Invention

The present invention relates to an objective lens element for use in an optical head device that performs at least one of recording, reproducing, and erasing of information on an optical information storage medium.

2. Description of the Background Art

As media that record a large amount of information with a high density, there are optical information storage media such as optical discs. Optical discs record information as pit-shaped patterns thereon, and are widely used for the purposes of recording digital audio files, video files, document files, and data files. Examples of functions required for performing recording, reproducing, and erasing of information on an optical disc with high reliability by using a light beam converged on a micro spot are a converging function to form a diffraction-limited micro spot, focus control (focus servo) of an optical system, tracking control, and pit signal (information signal) detection.

In recent years, due to advancement of optical system design technology and shortening of the wavelengths of semiconductor lasers which are light sources, development has progressed concerning optical discs that have a higher-density storage capacity further than ever. One approach to density increase is to increase the optical disc-side numerical aperture (NA) of a light-converging optical system which converges a light beam to form a micro spot on the optical disc. However, when the NA of the light-converging optical system is increased, an amount of a generated aberration increases with respect to a certain amount of tilt of the optical axis. In order to prevent this problem, it is necessary to decrease the thickness of a layer (hereinafter, referred to as "base material thickness") provided on a recording surface of the optical disc. In the present specification, the "base material thickness" means a thickness from a light beam incident surface to an information recording surface of an optical disc.

For compact discs (CD) which are first generation optical discs, infrared light (a wavelength $\lambda_3$: 780 to 820 nm) and an objective lens having an NA of 0.45 are used. The base material thickness of CD is 1.2 mm. For DVD which is second generation, red light (a wavelength $\lambda_2$: 630 to 680 nm) and an objective lens having an NA of 0.6 are used. The base material thickness of DVD is 0.6 mm. For third generation optical discs, blue light (a wavelength $\lambda_1$: 390 to 415 nm) and an objective lens having an NA of 0.85 are used. The base material thickness of third generation optical discs is 0.1 mm. As described above, as the recording density increases, the base material thickness of the optical disc decreases.

In view of economical efficiency and space occupied by an apparatus, an optical information recording/reproducing apparatus is desired which can perform recording and reproducing on optical discs having different base material thicknesses and recording densities. For this, a light-converging optical system which can converge a light beam to a diffraction limit on a recording surface of each of optical discs having different base material thicknesses, and an optical head device including this light-converging optical system, are necessary. In addition, when recording and reproducing are performed on an optical disc having a large base material thickness, it is necessary to converge a light beam on a recording surface located deeper than a beam incident surface of the optical disc, and thus the focal length has to be increased.

Prior art documents disclose configurations intended for compatible reproducing and compatible recording on an optical disc having a base material thickness of 0.6 mm and compatible with the wavelength $\lambda_2$ (red light) and on an optical disc having a base material thickness of 0.1 mm and compatible with the wavelength $\lambda_1$ (blue light).

A first prior art example is a configuration in which a wavelength-selective phase plate is combined with an objective lens. This is disclosed in Japanese Laid-Open Patent Publication No. 10-334504 and the Proceedings of ISOM2001 (Session We-C-05), P30. The configuration disclosed in the Proceedings of ISOM2001 (Session We-C-05), P30 will be described with reference to FIGS. 21 and 22. FIG. 21 illustrates a schematic configuration of an optical head device. Parallel light emitted from a blue optical system 51 including a blue light source of a wavelength $\lambda_1$ (405 nm) passes through a beam splitter 161 and a wavelength selection phase plate 205 and is converged by an objective lens 50 on an information recording surface of an optical disc 10 (third generation optical disc) having a base material thickness of 0.1 mm. The light reflected by the optical disc 10 travels along the reverse path and is detected with a detector of the blue optical system 51. Diverging light emitted from a red optical system 52 including a red light source of a wavelength $\lambda_2$ (650 nm) is reflected by the beam splitter 161, passes through the wavelength selection phase plate 205, and is converged by the objective lens 50 on an information recording surface of an optical disc 10 (second generation optical disc: DVD) having a base material thickness of 0.6 mm. The light reflected by the optical disc 10 travels along the reverse path and is detected with a detector of the red optical system 52.

The objective lens 50 is designed such that when the parallel light of the wavelength $\lambda_1$ is incident thereon, a convergence spot is formed at a position where the light has passed through a protective layer having a base material thickness of 0.1 mm. When recording and reproducing are performed on DVD, a spherical aberration occurs due to a difference in base material thickness. In order to compensate the spherical aberration, the light beam emitted from the red optical system 52 is adjusted to be diverging light, and the wavelength selection phase plate 205 is used. When light incident on the objective lens is adjusted to be diverging light, a new spherical aberration occurs. Thus, the spherical aberration occurring due to the difference in base material thickness can be cancelled by this new spherical aberration. Further, the wavefront is corrected also by the wavelength selection phase plate 205.

FIGS. 22A and 22B are a plan view and a cross-sectional view of the wavelength selection phase plate 205. The phase plate 205 has phase steps 205a of heights h and 3h. Here, the refractive index with respect to the wavelength $\lambda_1$ is $n_1$, and $h=\lambda_1/(n_1-1)$. When the light of the wavelength $\lambda_1$ is used, an optical path difference caused by the phase step of the height h is the used wavelength $\lambda_1$ and corresponds to a phase difference of $2\pi$. Thus, the optical path difference is the same as a phase difference of 0. Therefore, the phase steps 205a do not influence the phase distribution of the light of the wavelength $\lambda_1$ and hence do not influence recording and reproducing on the optical disc 10. Meanwhile, when the light of the wavelength $\lambda_2$ is used, designing is performed such that an optical path difference (h×($n_2$−1)) which is provided by the step to the light of the wavelength $\lambda_2$ has a value other than an integral multiple of the wavelength (e.g., 0.6 times). By utilizing the phase difference caused by the optical path difference, the aberration compensation described above is performed.

As a second prior art example, a configuration in which a refraction type objective lens and a diffraction element are combined is disclosed. In Japanese Laid-Open Patent Publication No. 2004-071134, in an optical head device which performs recording or reproducing on a high-density optical disc by using an objective lens having a high NA, a sawtooth-like diffraction element is used in order to be able to also perform recording or reproducing on conventional optical discs such as DVD. The sawtooth height is set such that when blue light is used, the length of the optical path becomes 2λ, and 2nd order diffracted light is used. The sawtooth-like diffraction element emits 1st order diffracted light when red light is incident thereon. The braze direction is as in a convex lens type, and chromatic aberration compensation of the refractive lens is performed. The diffraction order when red light is used is lower than the diffraction order when blue light is used. Thus, the sawtooth-like diffraction element serves as a concave lens for red light, thereby providing an effect that the working distance can be increased.

Further, Japanese Laid-Open Patent Publication No. 2004-071134 also discloses a diffraction element shown in FIG. 23A. The diffraction element shown in FIG. 23A has a stair-like cross-sectional shape and is composed of consecutive unit steps whose number is an integer number. Each unit step provides an optical path difference of about 1.25 wavelengths to a light beam of the wavelength $\lambda_1$. Specifically, the wavelength $\lambda_1$ is 390 to 415 nm, and a stair shape is provided in which one cycle consists of steps which are 0 times, 1 times, 2 times, and 3 times that of the unit step in height from the outer side of the diffraction element toward the optical axis. With respect to blue light, as shown in FIG. 23B, the phase changes in the same direction as that of the stair shape and a convex lens effect is exerted. With respect to red light, as shown in FIG. 23C, the phase changes in the direction opposite to that of the stair shape and a concave lens effect is exerted. Thus, when blue light is used, a chromatic aberration compensation effect of the refractive lens is obtained. In addition, when red light is used, an effect that the working distance (the interval between the objective lens surface and the surface of an optical disc) can be increased is obtained due to the concave lens effect.

As a third conventional art example, a configuration in which a relay lens is inserted between an infrared light source and an objective lens, thereby also realizing compatibility with a first generation optical disc having a base material thickness of 1.2 mm, is disclosed in Japanese Laid-Open Patent Publication No. 2004-281034.

Japanese Laid-Open Patent Publication Nos. 10-334504 and 2004-071134 merely disclose the method for compatibility with the above second generation optical discs and the above third generation optical discs. In addition, Japanese Laid-Open Patent Publication No. 2004-281034 discloses the method for compatibility with the above first generation optical discs, but requires a relay lens.

Further, it is desired that an element that realizes compatibility is integrally formed on the objective lens surface, in view of cost reduction by decrease in number of parts. However, in the conventional art described above, only the exemplary configuration, in which the phase plate or the diffraction element is provided independently of the refraction type objective lens, is disclosed, and there is no description about integrally forming an element, which realizes compatibility, on the objective lens surface.

Moreover, in order to produce objective lenses at low cost and in large quantities, the material of the objective lenses is preferably resin rather than glass. In general, the material cost of resin is low, and it is also possible to mold resin at a lower temperature than to mold glass. Thus, the mold can be used long and the molding time can be shortened. Therefore, by molding resin to produce objective lenses, the manufacturing cost can be reduced. However, the refractive index of a high-NA objective lens made of resin changes due to temperature change. The refractive index change causes the refractive power of the lens surface to shift from a designed value, whereby a spherical aberration occurs. A lower-order aberration greatly deteriorates the quality of an information reproduction signal, and thus a 3rd order spherical aberration is problematic.

SUMMARY OF THE INVENTION

It is an object of the present invention to provide an objective lens element having excellent compatibility with optical discs having different base material thicknesses. In addition, it is another object of the present invention to provide an objective lens element whose change in spherical aberration amount is small even when the environmental temperature changes.

The present invention is directed to an objective lens element which has optically functional surfaces on an incident side and an exit side, which converges a first incident light beam of a wavelength $\lambda_1$ through a base plate having a thickness $t_1$ to form a spot, and which converges a second incident light beam of a wavelength $\lambda_2$ longer than the wavelength $\lambda_1$ through a base plate having a thickness $t_2$ larger than the thickness $t_1$ to form a spot.

In the objective lens element, at least either one of the optical function surfaces is a refractive surface which deflects the first and second incident light beams by refractive power all over the surface, is divided into an inner part which includes a rotational symmetry axis and through which the first and second incident light beams that substantially contribute to spot formation pass, and an outer part which is a ring-shaped region surrounding the inner part and through which only the first incident light beam that substantially contributes to spot formation passes, and has a plurality of discontinuous steps on the inner part. The plurality of steps change in height in the same direction from the optical axis toward the outer part, and each of the steps causes a constant optical path difference longer than the wavelength $\lambda_1$ to the first incident light beam and causes a constant optical path difference shorter than the wavelength $\lambda_2$ to the second incident light beam.

Alternatively, in the objective lens element, at least either one of the optical function surfaces is a refractive surface which deflects the first and second incident light beams by refractive power all over the surface, is divided into an inner part which includes a rotational symmetry axis and through which the first and second incident light beams that substantially contribute to spot formation pass, and an outer part which is a ring-shaped region surrounding the inner part and through which only the first incident light beam that substantially contributes to spot formation passes, and has a plurality of discontinuous steps. Each of the plurality of steps causes an optical path difference which is an integral multiple of the wavelength $\lambda_1$, to the first incident light beam at a predetermined environmental temperature. When an environmental temperature changes, tendency of spherical aberration change caused by change in shape of the refractive surface and tendency of spherical aberration change caused by change in optical path difference provided by the steps which is caused by change in refractive index are opposite to each other.

According to the present invention, by the steps provided on the optically functional surface, converging light of the wavelength $\lambda_1$ is further converged and converging light of the wavelength $\lambda_2$ is diffused. Thus, the focal point of the objective lens element can be changed so as to correspond to each of the base material thickness $t_1$ and $t_2$. In addition, an objective lens element whose change in spherical aberration amount is small even when the environmental temperature changes while light of the wavelength $\lambda_1$ is used can be realized.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1A is a diagram illustrating steps formed on a surface of an objective lens element according to Embodiment 1;

FIG. 1B is a diagram illustrating steps formed on a surface of an objective lens element according to Embodiment 1;

FIG. 1C is a diagram illustrating steps formed on a surface of an objective lens element according to Embodiment 1;

FIG. 23A is a diagram illustrating a step structure provided on a surface of an objective lens element;

FIG. 23B is a diagram illustrating a step structure provided on a surface of an objective lens element; and FIG. 23C is a diagram illustrating a step structure provided on a surface of an objective lens element.

DESCRIPTION OF THE PREFERRED EMBODIMENTS

Embodiment 1

Compatibility with BD and DVD

Figure 2:
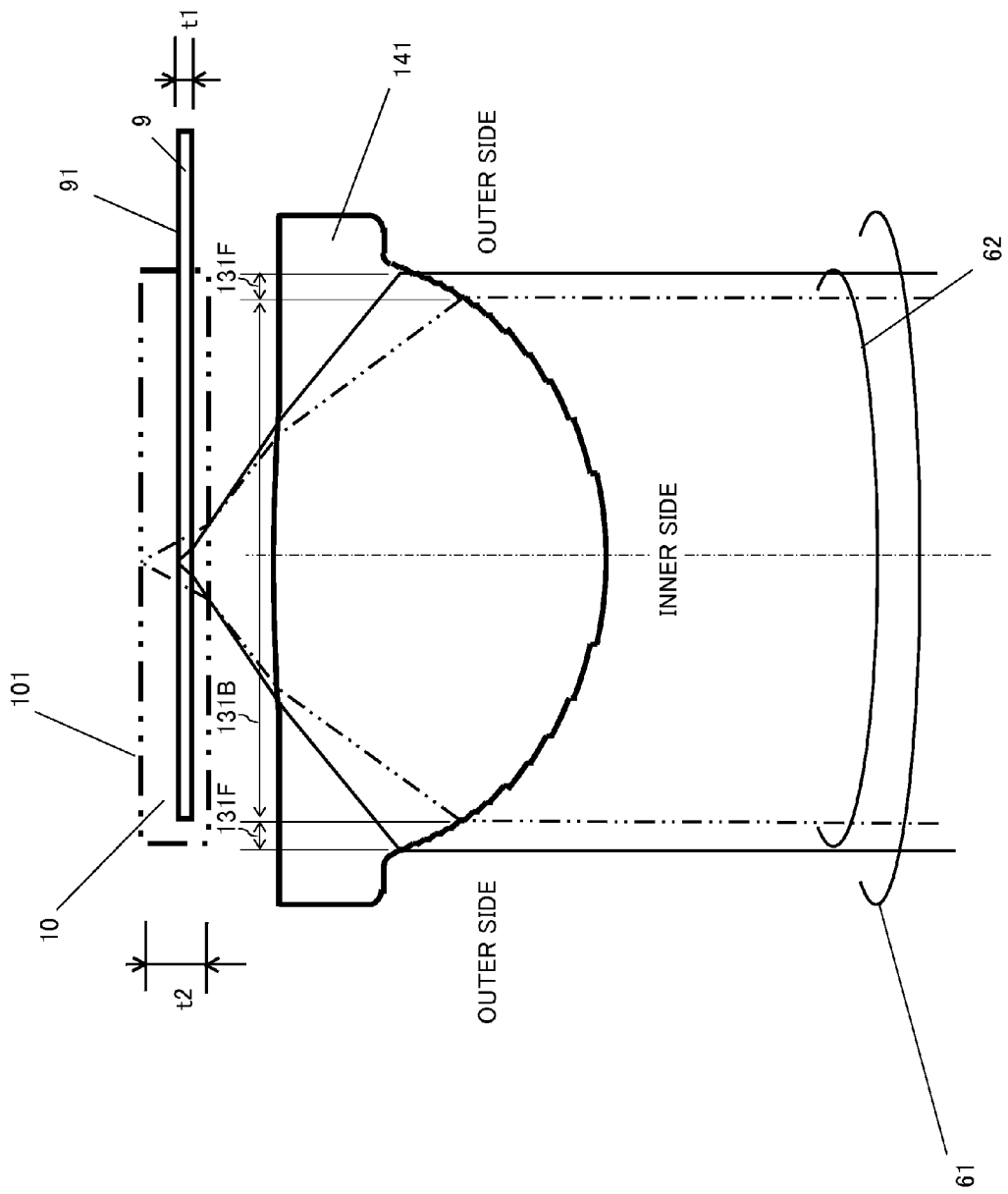
FIG. 2 is a diagram illustrating the objective lens element according to Embodiment 1.

FIG. 1 is a diagram illustrating steps formed on a surface of an objective lens element according to Embodiment 1. FIG. 1A is a diagram illustrating the physical shape of the steps. It should be noted that in reality, the steps are formed on a base surface which is a refractive surface (aspherical shape) in the surface of the objective lens element. FIG. 1B shows an amount of phase change provided by each step shown in FIG. 1A to light of a wavelength $\lambda_1$, and FIG. 1C shows an amount of phase change provided by each step shown in FIG. 1A to light of a wavelength $\lambda_2$ ($\lambda_2 > \lambda_1$). As an example, the light of the wavelength $\lambda_1$ is blue light (390 to 415 nm) for BD, and the light of the wavelength $\lambda_2$ is red light (630 to 680 nm) for DVD.

In FIG. 1A, the vertical direction indicates the thickness of the lens material in the optical axis direction, or the height thereof. For example, when a polyolefin resin is used as the material of the objective lens element, an element material having a refractive index $n_b$ of about 1.522 with respect to first incident light can be used. A step $d_1$ (hereinafter, also referred to as "unit step") is dimensioned so as to cause an optical path difference of about 1.25 wavelengths, or a phase difference of about ($2\pi + \pi/2$), to the light of the wavelength $\lambda_1$. The unit step $d_1$ can be represented by the following equation.

$$d_1 = \lambda_1/(n_b-1) \times 1.25$$

It should be noted that the "optical path difference" means the difference between the length of an optical path in the case where the steps are present (the medium of the step portion is the lens material) and the length of an optical path in the case where no steps are present (the medium of the step portion is air).

Where the unit step is $d_1$, the height (level) from the base surface is an integral multiple of $d_1$. Thus, an amount of phase change provided by the step shape to the light of the wavelength $\lambda_1$ is an integral multiple of ($2\pi + \pi/2$). This substantially means that the amount of phase change changes by $\pi/2$ each time the height from the base surface increases by one step ($d_1$) as shown in FIG. 1B.

Among lens materials composed of a polyolefin resin, a lens material having a refractive index $n_r$ of about 1.505 with respect to the light of the wavelength $\lambda_2$ is available. The optical path difference provided by the step $d_1$ to the light of the wavelength $\lambda_2$ can be represented by $d_1 \times (n_r-1)$. Where $\lambda_1$ is 405 nm, $\lambda_2$ is 650 nm, $n_b$ is 1.522, and $n_r$ is 1.505, the optical path difference corresponds to about 0.75 wavelength, and this means that the amount of phase change changes by $-\pi/2$ each time the height from the base surface increases by one step ($d_1$).

When the height of each step structure from the base surface is an integral multiple of $d_1$ and a stair-like cross-sectional shape is provided as shown in FIG. 1A, the amount of phase change provided to the light of the wavelength $\lambda_1$ changes by $\pi/2$ per step as shown in FIG. 1B. In other words, the optical path difference changes toward the optical axis of the objective lens element in steps of $+\frac{1}{4}$ wavelength.

Meanwhile, as shown in FIG. 1C, the amount of phase change provided to the light of the wavelength $\lambda_2$ changes by $-\pi/2$ per step. In other words, the optical path difference changes toward the optical axis of the objective lens element in steps of $-\frac{1}{4}$ wavelength. The amount of phase change is positive when the light of the wavelength $\lambda_1$ is used, while the amount of phase change is negative when the light of the wavelength $\lambda_2$ is used. This means that the light of the wavelength $\lambda_1$ and the light of the wavelength $\lambda_2$ are subjected to the opposite actions from the steps.

Here, when the steps are formed such that the height from the base surface increases toward the inner side of the objective lens element as shown in FIG. 1A, the optical path of the light of the wavelength $\lambda_1$ is lengthened toward the inner side. On the other hand, the optical path of the light of the wavelength $\lambda_2$ is shortened toward the inner side. In other words, when the intervals at which the phase steps are formed are appropriately set and the objective lens element is configured to exert a convex lens effect on the first incident light, a concave lens effect is exerted on second incident light. Then, the focal point of the first incident light gets close to the objective lens element, while the focal point of the second incident light moves away from the objective lens element. Thus, an effect is obtained that the second incident light can be converged on an information recording surface through a thicker base material.

In the present embodiment, the steps shown in FIG. 1A are formed in a stair shape in which the height monotonically increases or decreases. Thus, the step structure in the present embodiment does not serve as a diffraction element having a periodic structure in which the height increases and decreases every certain cycle (see FIG. 23A), but serves as an element which changes a phase in a stair-like manner.

FIG. 2 is a diagram illustrating the objective lens element according to Embodiment 1.

On an optically functional surface of the objective lens element 141 on an incident side, an inner part 131B including a rotational symmetry axis and a ring-shaped outer part 131F surrounding the inner part 131B are provided. When the light of the wavelength $\lambda_1$ is used, the objective lens element 141 converges first incident light 61 incident on both the inner part 131B and the outer part 131F, and forms a spot on an information recording surface 91 of an optical disc 9 through a base material having a thickness $t_1$. In addition, when the light of the wavelength $\lambda_2$ is used, the objective lens element 141 converges second incident light 62 incident on the inner part 131B, and forms a spot on an information recording surface 101 of an optical disc 10 through a base material having a thickness $t_2$. The outer part 131F is a region which substantially does not contribute to spot formation when the light of the wavelength $\lambda_2$ is used. Where the numerical aperture defined when the first incident light 61 is converged on the information recording surface 91 of the optical disc 9 is $NA_1$ and the numerical aperture defined when the second incident light 62 is converged on the information recording surface 101 of the optical disc 10 is $NA_2$, $NA_1$ is equal to or higher than 0.85 and $NA_2$ is equal to or higher than 0.6.

In other words, the inner part 131B is a region shared by the light of the wavelength $\lambda_1$ and the light of the wavelength $\lambda_2$, and the outer part 131F is a region dedicated for the light of the wavelength $\lambda_1$. On the inner part 131B, the stair-like step structure shown in FIG. 1A is formed. The outer part 131F can be configured as in any of (1) to (4) below.

(1) On the outer part 131F as well, the same step structure as that formed on the inner part 131B is formed. In this case, the outer part 131F suffices to be designed such that when the light of the wavelength $\lambda_1$ is used, the light incident on the outer part 131F is converged on the information recording surface 101 through the base material having the thickness $t_1$, and when the light of the wavelength $\lambda_2$ is used, the light incident on the outer part 131F generates a great aberration at a position where the light has passed through the base material having the thickness $t_2$ and is substantially not converged on the information recording surface 91.

(2) Alternatively, no steps may be formed on the outer part 131F, and the outer part 131F may be designed such that when the light of the wavelength $\lambda_1$ is used, the light incident on the outer part 131F is converged on the information recording surface 101 through the base material having the thickness $t_1$, and when the light of the wavelength $\lambda_2$ is used, the light incident on the outer part 131F generates a great aberration at a position where the light has passed through the base material having the thickness $t_2$ and is substantially not converged on the information recording surface 91.

(3) Still alternatively, steps each of which causes an optical path difference of 1 wavelength to the first incident light of the wavelength $\lambda_1$ may be formed on the outer part 131F. In this case, a phase difference substantially does not occur in the light of the wavelength $\lambda_1$ having passed through the outer part 131F, and thus the light of the wavelength $\lambda_1$ incident on the outer part 131F is converged on the information recording surface 101 through the base material having the thickness $t_1$. Meanwhile, each of these steps provides a phase difference which is about 0.6 times of the wavelength $\lambda_2$, to the light of the wavelength $\lambda_2$. Thus, a great aberration occurs and the light of the wavelength $\lambda_2$ incident on the outer part 131F is substantially not converged on the information recording surface 91.

Figure 5A:
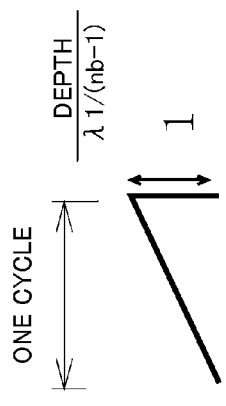
FIG. 5A is a diagram illustrating an example of a diffraction grating formed on the outer part.
Figure 5B:
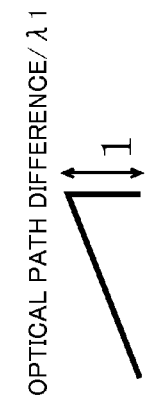
FIG. 5B is a diagram illustrating an example of a diffraction grating formed on the outer part.
Figure 5C:
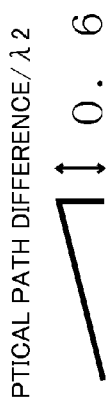
FIG. 5C is a diagram illustrating an example of a diffraction grating formed on the outer part.

(4) Still alternatively, a sawtooth-like diffraction grating may be formed on the outer part 131F, and designing may be performed such that the light of the wavelength $\lambda_1$ incident on the outer part 131F is converged on the information recording surface 101 through the base material having the thickness $t_1$ and the light of the wavelength $\lambda_2$ incident on the outer part 131F is substantially not converged on the information recording surface 91. In this case, the sawtooth height is preferably set to such a height that an optical path difference of 1 wavelength is caused to the light of the wavelength $\lambda_1$ as shown in FIG. 5A. When the sawtooth height is set to a height equal to 1 wavelength of the light of $\lambda_1$ as shown in FIG. 5B, the diffraction efficiency of the 1st order diffracted light increases. Thus, the light of the wavelength $\lambda_1$ incident on the outer part 131F can be converged through the base material having the thickness $t_1$. Meanwhile, with respect to the light of the wavelength $\lambda_2$, the sawtooth height is only about 0.6 times of wavelength as shown in FIG. 5C. Thus, the light of the wavelength $\lambda_2$ incident on the outer part 131F is diffracted into 1st order diffracted light and zero order diffracted light and is not converged on a point, and the outer part 131F exerts an aperture limiting function.

As in the present embodiment, a monotonically-increasing type or monotonically decreasing type stair-like step structure is suitable to be integrally formed directly on the surface of the objective lens element 141. The reason will be described with reference to FIG. 3.

Figure 3:
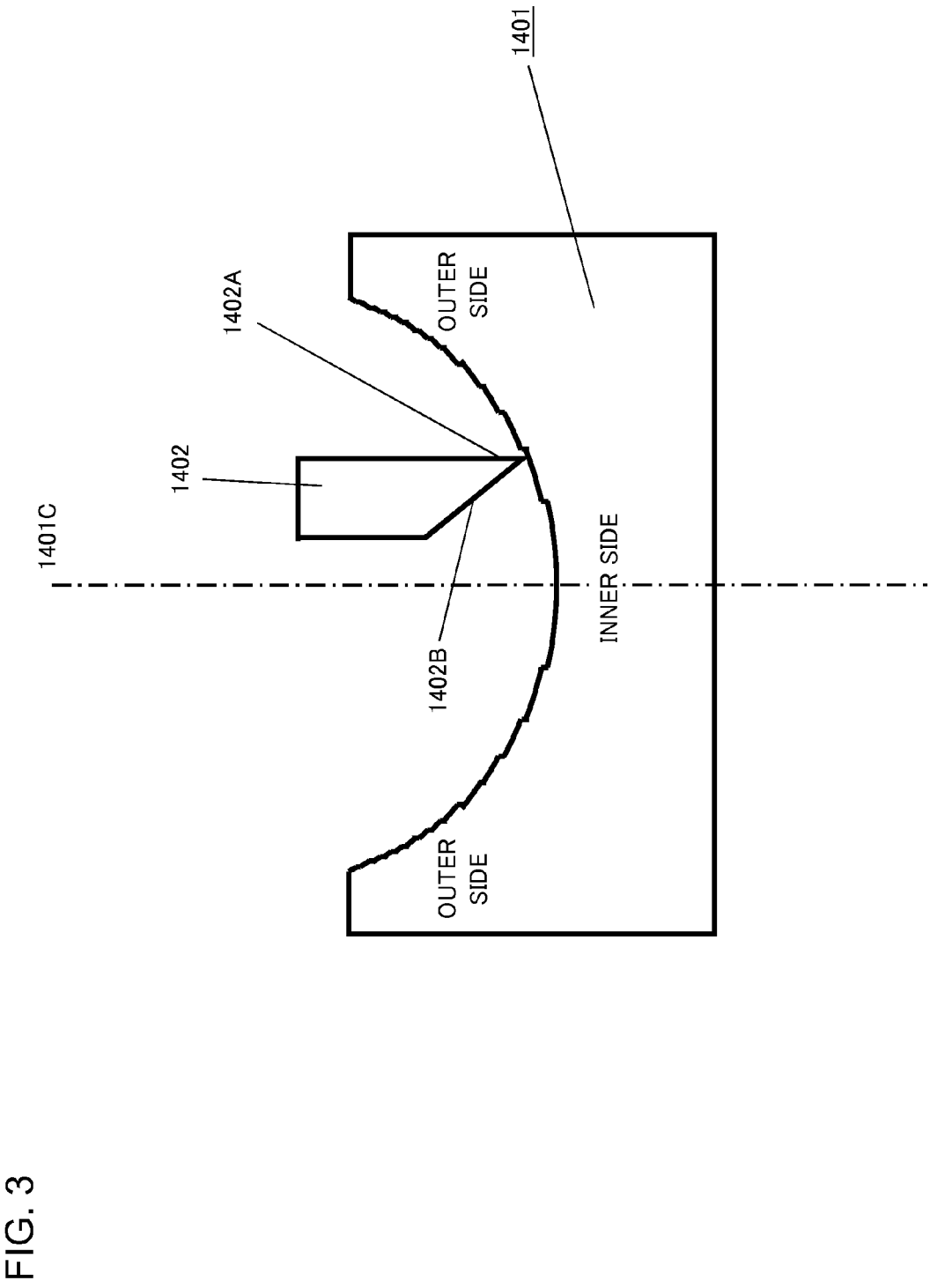
FIG. 3 is a diagram illustrating a mold used for manufacturing the objective lens element shown in FIG. 2 and a method for manufacturing the mold.

FIG. 3 is a diagram illustrating a mold used for manufacturing the objective lens element 141 shown in FIG. 2 and a method for manufacturing the mold.

A concavity of the mold 1401 shown in FIG. 3 is a surface for shaping the incident-side surface of the objective lens element 141 shown in FIG. 2. In order to integrally form the above steps on the surface of the objective lens element 141, ring-shaped recessed and raised portions corresponding to the shape of the steps are formed on the concavity of the mold 1401. When the height of the steps increases toward the inner side as shown in FIG. 1A, the ring-shaped recessed portions formed on the concavity of the mold 1401 suffices to be deeper on the inner side. For this mold shape, machining is possible by cutting with a cutter 1402. Cutting is performed with rotation of the mold 1401 about a central axis 1401C of the mold 1401, to form concentric ring zones on the concavity of the mold 1401.

The cutter 1402 has a surface 1402A and an inclined surface 1402B which makes a predetermined angle with respect to the surface 1402A, and its thickness decreases toward its pointed end. During cutting, the surface 1402A is located so as to extend upwardly and substantially perpendicularly from a portion where the cutter 1402 contacts the mold 1401, and the steep step shape on the outer side is cut. The inclined surface 1402B is located so as to be inclined toward the inner side. In order to prevent the cutter 1402 from being chipped or broken, the cutter 1402 has to have a certain level of strength. For this, the inclined surface 1402B is desirably provided such that the thickness increases with increasing distance from the pointed end. In the example of FIG. 3, the inclined surface 1402B is inclined toward the inner side, and no problem occurs in terms of cutting, since the ring-shaped recessed portions formed on the concavity of the mold 1401 are monotonically deepened toward the inner side. Meanwhile, when the step structure shown in FIG. 23A is formed, it is necessary to form, on the concavity of the mold, ring-shaped recessed portions whose depth periodically increases and decreases. Thus, cutting with a tool as shown in FIG. 3 is difficult. On the other hand, the thickness monotonically changes in the stair-like structure in the present embodiment, and thus machining can be realized as designed.

Embodiment 2

Temperature Compensation of Resin Objective Lens

As a material forming an objective lens element, glass and resin (plastic) are often used. Glass changes less in properties with respect to temperature change, and thus the performance thereof can stably be obtained. Meanwhile, resin can be changed in shape even at a low temperature as compared to glass, and thus the manufacturing cost can be reduced. In addition, resin has an advantage of being lightweight. However, resin has a drawback in that its change in refractive index with temperature change is greater by 10 times than that of glass. Particularly, when an objective lens having a high numerical aperture is formed from resin, the refractive index changes with temperature change, and thus the spherical aberration changes, which is a problem.

In a system for optical disc called Blue-Ray Disc (BD) employing blue light, the numerical aperture (NA) is set so as to be equal to or higher than 0.85, and information reproducing is realized with a high recording density. When an objective lens for BD having a numerical aperture of 0.85 or higher is formed by a resin lens, it is desirable to reduce change in spherical aberration at temperature change. Particularly, it is desirable to separate a spherical aberration into each order and to reduce a 3rd order spherical aberration. The lowest order spherical aberration is caused by a power component, namely, a lens effect, and is reduced by a focus control mechanism of an optical pickup in a short time of about 1 ms. The optical pickup for BD includes means for compensating a 3rd order spherical aberration but often does not include means for directly detecting a 3rd order spherical aberration. This is because in order to obtain an amount of change in 3rd order spherical aberration as a spherical aberration detection signal detected within 1 ms, a detection optical system of the optical pickup including a photodetector is complicated, leading to size increase and cost increase. In general, a 3rd order spherical aberration is often compensated by driving the spherical aberration compensating means in accordance with output of a temperature sensor provided in the optical pickup. In other words, since a spherical aberration is not directly detected and open loop control is performed in accordance with output of the temperature sensor, real-time compensation is not performed within 1 ms but low-accurate compensation is performed for a time period longer than 1 ms. Thus, it is desirable to reduce an amount of change in 3rd order spherical aberration with temperature change. Specifically, the amount of change in 3rd order spherical aberration per temperature change of 30° C. is desirably equal to or less than 70 m$\lambda$. 70 m$\lambda$ or $\lambda/14$ corresponds to so-called Marechal Criterion. The amount of change in 3rd order spherical aberration per temperature change of 30° C. is more preferably equal to or less than 60 m$\lambda$. In addition, the amount of change in 5th order spherical aberration per temperature change of 30° C. is preferably equal to or less than 30 m$\lambda$.

Figure 6:
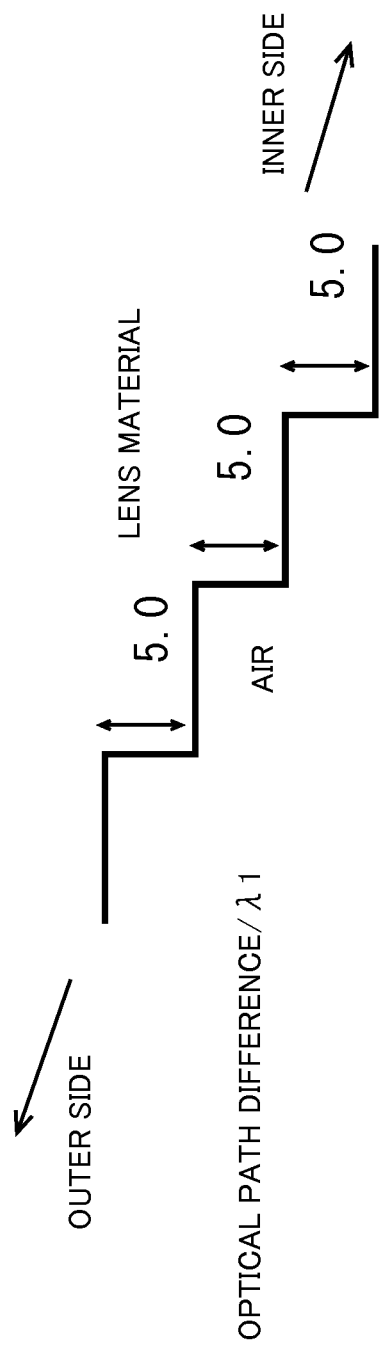
FIG. 6 is a diagram illustrating steps formed on a surface of an objective lens element according to Embodiment 2.

FIG. 6 is a diagram illustrating steps formed on a surface of an objective lens element according to Embodiment 2.

As an example, an objective lens having a focal length of 1.3 mm and a numerical aperture of 0.86 was produced from a polyolefin resin. At that time, when the temperature changes by 30° C., a 3rd order spherical aberration change of about 130 m$\lambda$ occurred. Thus, as shown in FIG. 6, steps each of which causes an optical path difference which is an integral multiple of the wavelength $\lambda_1$ at a specific environmental temperature, are provided on a surface of an objective lens element. FIG. 6 illustrates the case where the optical path difference caused by each step is 5 times of the wavelength $\lambda_1$, but the present invention is not particularly limited to 5 times. Being an integral multiple is a condition, and numerical values other than 5 times, such as 6 times and 4 times, are also possible depending on the designing conditions.

Where the physical height of each step is $d_5$, the optical path difference caused by the step is represented by $d_5 \times (n_5 - 1)$. Here, $n_5$ is the refractive index of the lens material. When the refractive index of the lens material changes due to temperature change, the optical path difference caused by the step also changes. This change is utilized to reduce a spherical aberration caused by change in angle of refraction at a refractive surface, particularly, a 3rd order spherical aberration. Specifically, the steps are designed such that when the environmental temperature changes, tendency of change in spherical aberration caused by change in refractive surface shape is opposite to tendency of change in spherical aberration caused by change in optical path difference provided by the steps which is caused by change in refractive index. As a result, when the environmental temperature changes, a spherical aberration caused by change in refractive surface shape and a spherical aberration caused by change in optical path difference provided by the steps which is caused by change in refractive index cancel each other, whereby an aberration is reduced.

In order to reduce a spherical aberration caused by temperature change when the light of the wavelength $\lambda_1$ is used, the thickness of the steps shown in FIG. 6 desirably monotonically increases or monotonically decreases in the same direction. When being configured as described above, a mold for molding the objective lens element can easily be produced as described in Embodiment 1.

Embodiment 3

Temperature Compensation of Resin Objective Lens and Compatibility with BD and DVD The present embodiment realizes compatibility with BD and DVD as described in Embodiment 1 and suppression of a spherical aberration in the resin objective lens at temperature change as described in Embodiment 2, at the same time. Here, compatibility means that a single objective lens element can form a spot on a recording surface through the base material having the thickness $t_1$ when the light of the wavelength $\lambda_1$ is used, and can form a spot on a recording surface through the base material having the thickness $t_2$ when the light of the wavelength $\lambda_2$ is used.

Figure 7:
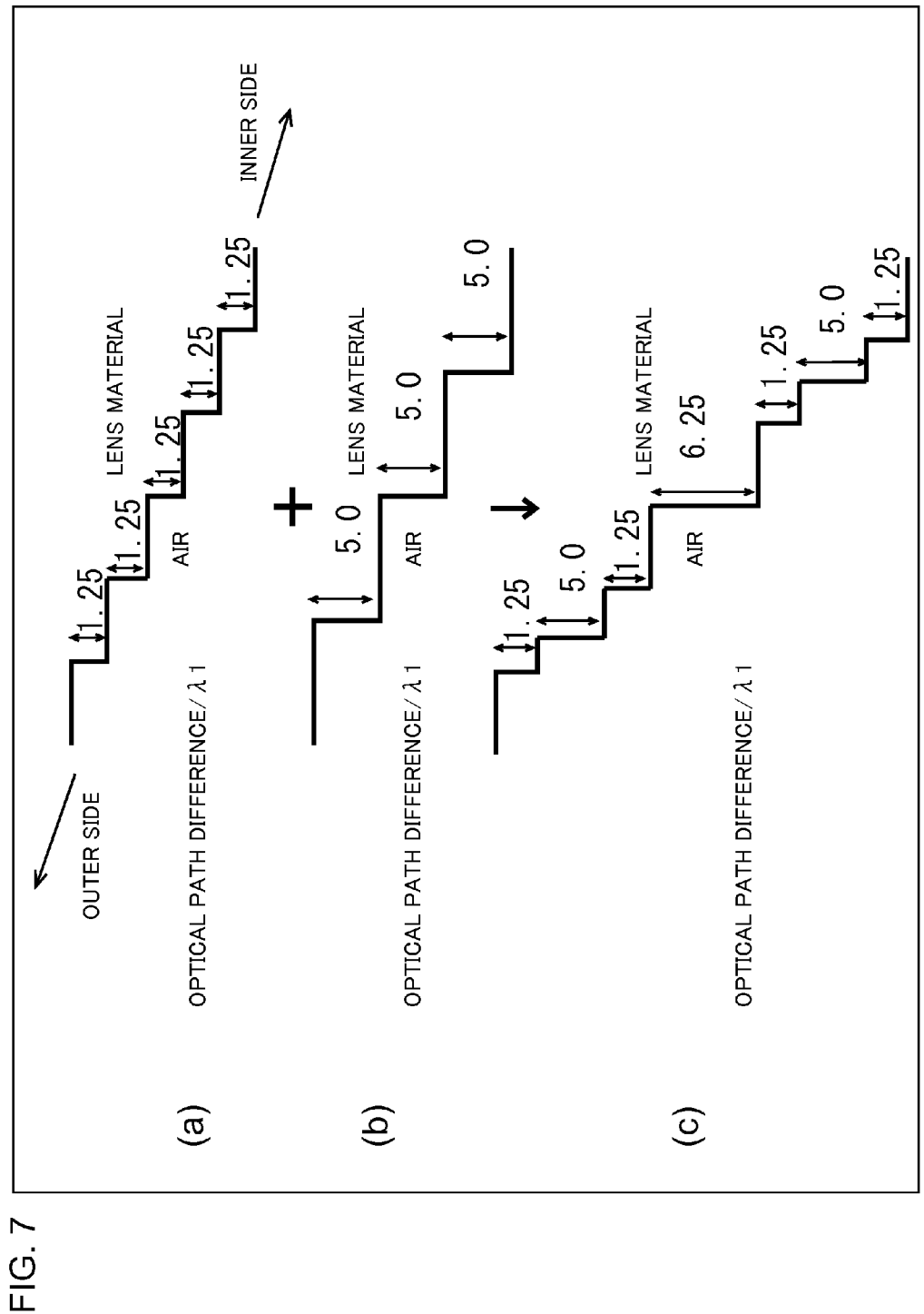
FIG. 7 is a diagram illustrating steps formed on a surface of an objective lens element according to Embodiment 3.

FIG. 7 is a diagram illustrating steps formed on a surface of an objective lens element according to Embodiment 3. FIG. 7(a) is a diagram illustrating the physical shape of steps which realize the compatibility described in Embodiment 1. FIG. 7(b) is a diagram illustrating the physical shape of steps for realizing the spherical aberration suppression described in Embodiment 2. Each of the steps shown in FIG. 7(b) causes an optical path difference which is an integral multiple of the wavelength $\lambda_1$, at a specific temperature as described in Embodiment 2. FIG. 7(c) is a diagram illustrating a shape obtained by combining the step shape of FIG. 7(a) and the step shape of FIG. 7(b). In Embodiment 3, the step shape of FIG. 7(c) is formed on a base surface which is a refractive surface (aspherical shape) in the surface of the objective lens element.

It should be noted that the steps of FIG. 7(b) which are components of the steps of FIG. 7(c) have differences from those according to Embodiment 2 (FIG. 6). The optical path difference caused by each step of FIG. 6 to the light of the wavelength $\lambda_1$ is an integral multiple of the wavelength $\lambda_1$, while the optical path difference caused by each step of FIG. 7(b) to the light of the wavelength $\lambda_1$ is 5N times (N is an integer other than 0) of the wavelength $\lambda_1$. At that time, each step of FIG. 7(b) causes an optical path difference which is 3N times of the wavelength $\lambda_2$, to the light of the wavelength $\lambda_2$, and a great aberration does not occur. Compatibility with the wavelength $\lambda_1$ and the wavelength $\lambda_2$ is realized by the step shape of FIG. 7(a), and the steps of FIG. 7(b) are intended to suppress a spherical aberration caused by temperature change when the light of the wavelength $\lambda_1$ is used. Thus, it is desirable that each step of FIG. 7(b) does not cause a great aberration to the light of the wavelength $\lambda_2$. Due to this reason, the optical path difference caused by each step of FIG. 7(b) to the light of the wavelength $\lambda_1$ is desirably 5N times (N is an integer other than 0) of the wavelength $\lambda_1$.

Each of the step structure of the FIG. 7(a) and the step structure of FIG. 7(b) is desirably a stair-like structure in which the thickness monotonically increases or monotonically decreases in the same direction. When being configured as described above, the step structure of FIG. 7(c) is also a stair-like structure in which the thickness monotonically increases or monotonically decreases. Thus, a mold for molding the objective lens element can easily be produced.

Figure 8:
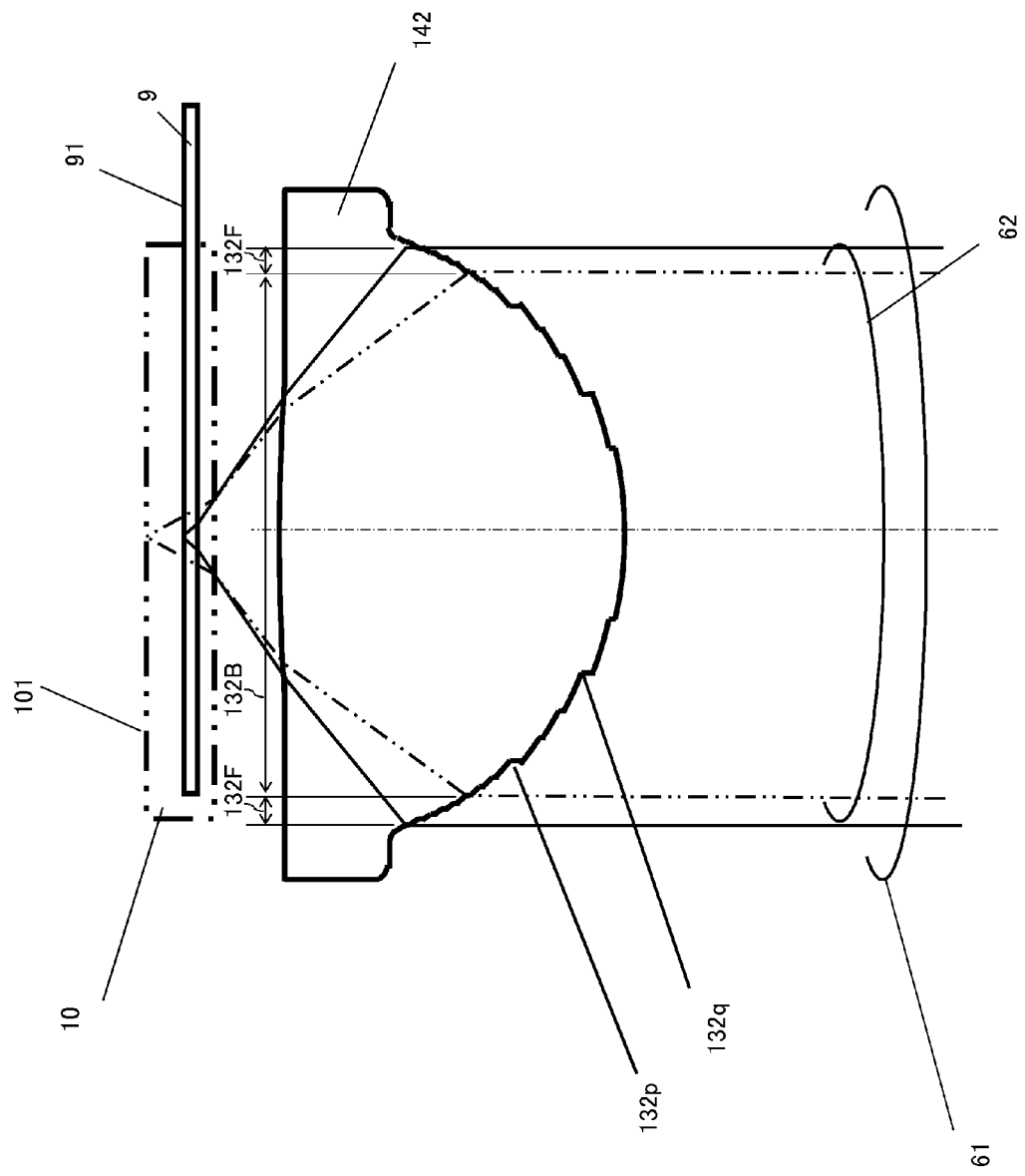
FIG. 8 is a diagram illustrating the objective lens element according to Embodiment 3.

FIG. 8 is a diagram illustrating the objective lens element according to Embodiment 3.

On at least an inner part 132B, the stair-like structure shown in FIG. 7(c) is formed. The reference characters 132p and 132q assigned to the inner part 132B of FIG. 8 correspond to the steps shown in FIG. 7(b). When the light of the wavelength $\lambda_1$ is used, the objective lens element 142 converges the first incident light 61 incident on both the inner part 132B and an outer part 132F, and forms a spot on the information recording surface 91 of the optical disc 9 through the base material having the thickness $t_1$. In addition, when the light of the wavelength $\lambda_2$ is used, the objective lens element 142 converges the second incident light 62 incident on the inner part 132B, and forms a spot on the information recording surface 101 of the optical disc 10 through the base material having the thickness $t_2$. Where the numerical aperture defined when the first incident light 61 is converged on the information recording surface 91 of the optical disc 9 is $NA_1$ and the numerical aperture defined when the second incident light 62 is converged on the information recording surface 101 of the optical disc 10 is $NA_2$, $NA_1$ is equal to or higher than 0.85 and $NA_2$ is equal to or higher than 0.6.

In other words, the inner part 132B is a region shared by the light of the wavelength $\lambda_1$ and the light of the wavelength $\lambda_2$, and the outer part 132F is a region dedicated for the light of the wavelength $\lambda_1$. On the inner part 132B, the stair-like step structure shown in FIG. 1A is formed. The outer part 132F can be configured as in (5) to (8) below.

(5) A step structure which is the same as that provided on the inner part 132B is formed on the outer part 132F. In this case, the outer part 132F suffices to be designed such that the light of the wavelength $\lambda_1$ forms a spot on the information recording surface 91 through the base material having the thickness $t_1$ but the light of the wavelength $\lambda_2$ causes a great aberration and is not converged on a position through the base material having the thickness $t_2$.

(6) Alternatively, the steps of FIG. 7(a) may not be formed on the outer part 132F. In this case, the outer part 132F suffices to be designed such that the light of the wavelength $\lambda_1$ forms a spot on the information recording surface 91 through the base material having the thickness $t_1$ but the light of the wavelength $\lambda_2$ causes a great aberration and is not converged through the base material having the thickness $t_2$.

Figure 4:
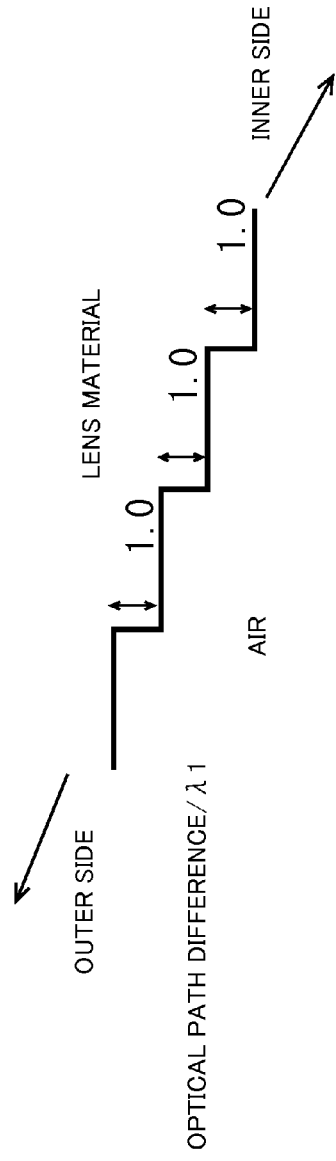
FIG. 4 is a diagram illustrating an example of a step structure formed on an outer part.

(7) Still alternatively, the steps shown in FIG. 4 each of which causes an optical path difference of 1 wavelength to the light of the wavelength $\lambda_1$ may be formed on the outer part 132F. In this case, with the optical path difference of 1 wavelength of the wavelength $\lambda_1$, a phase difference substantially does not occur. Thus, similarly to the case where no steps are formed, the light of the wavelength $\lambda_1$ is converged through the base material having the thickness $t_1$, but a phase difference of about 0.6 wavelength occurs in the light of the wavelength $\lambda_2$ and hence the light of the wavelength $\lambda_2$ is not converged through the base material having the thickness $t_2$.

(8) Still alternatively, a sawtooth-like diffraction grating may be formed on the outer part 132F. In this case, the outer part 132F suffices to be designed such that the light of the wavelength $\lambda_1$ forms a spot on the information recording surface 91 through the base material having the thickness $t_1$ but the light of the wavelength $\lambda_2$ is not converged through the base material having the thickness $t_2$. Further, the sawtooth height is preferably set to such a height that an optical path difference of 1 wavelength is caused to the light of the wavelength $\lambda_1$ as described with reference to FIG. 5A. When the sawtooth height is equal to 1 wavelength of the wavelength $\lambda_1$ as shown in FIG. 5B, the diffraction efficiency of the 1st order diffracted light increases. Meanwhile, with respect to the light of wavelength $\lambda_2$, the sawtooth height is only about 0.6 times of wavelength as shown in FIG. 5C. Thus, light is diffracted into 1st order diffracted light and zero order diffracted light and is not converged on a point. Therefore, an aperture limiting effect on the light of the wavelength $\lambda_1$ incident on the outer part 132F can be obtained.

(9) In order to suppress a spherical aberration caused by temperature change when the light of wavelength $\lambda_1$ is used, the steps shown in FIG. 6 may be provided on the outer part 132F. In addition, the steps shown in FIG. 6 may be formed on any of the above shapes provided on the outer part 132F. In this case, in order to facilitate production of a mold for the objective lens element 142, it is desirable to monotonically increase or monotonically decrease the thickness of the steps.

Embodiment 4

Compatibility with BD, DVD, and CD

An objective lens element according to the present embodiment converges light of a wavelength $\lambda_3$ through a base material having a thickness $t_3$, in addition to the compatibility with the wavelengths $\lambda_1$ and $\lambda_2$ as described in Embodiment 1.

Here, $t_1 < t_2 < t_3$, and
$NA_1 > NA_2 > NA_3$.

$NA_3$ is the numerical aperture defined when the light of the wavelength $\lambda_3$ is converged. The light of the wavelength $\lambda_3$ is, for example, infrared light of 780 to 820 nm.

Since the numerical aperture $NA_3$ is the lowest, the innermost portion of the objective lens element is used for conversing the light of the wavelength $\lambda_3$ on an information recording surface. Thus, the innermost portion of the objective lens element has to be formed so as to be able to converge light of three kinds of wavelengths through corresponding base materials having thicknesses. For that reason, in the present embodiment, a stair shape shown in FIG. 9A is formed on the innermost portion of the objective lens element.

Figure 9:
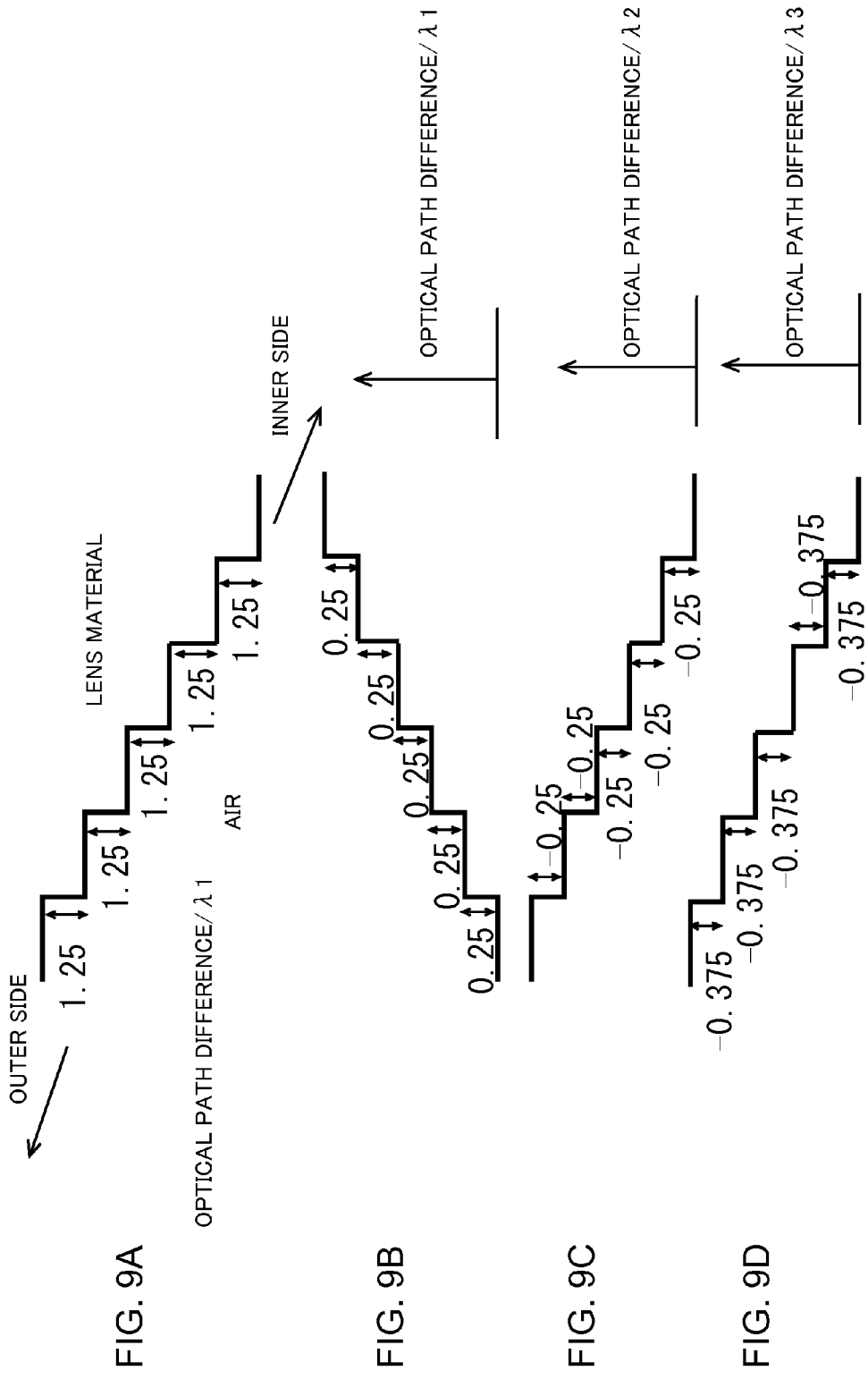
FIG. 9A is a diagram illustrating steps formed on a surface of an objective lens element according to Embodiment 4.
FIG. 9B is a diagram illustrating steps formed on a surface of an objective lens element according to Embodiment 4.
FIG. 9C is a diagram illustrating steps formed on a surface of an objective lens element according to Embodiment 4.
FIG. 9D is a diagram illustrating steps formed on a surface of an objective lens element according to Embodiment 4.

FIG. 9 is a diagram illustrating steps formed on a surface of the objective lens element according to Embodiment 4. FIG. 9A is a diagram illustrating the physical shape of the steps formed on the surface of the objective lens element according to Embodiment 4. The shape of FIG. 9A is formed on a base surface which is a refractive surface (aspherical shape) in the surface of the objective lens element. FIG. 9B shows an amount of phase change provided by each step shown in FIG. 9A to the light of the wavelength $\lambda_1$. FIG. 9C shows an amount of phase change provided by each step shown in FIG. 9A to the light of the wavelength $\lambda_2$. FIG. 9D shows an amount of phase change provided by each step shown in FIG. 9A to the light of the wavelength $\lambda_3$.

In FIG. 9A, the vertical direction indicates the thickness of the lens material in the optical axis direction, or the height thereof. Each step is designed to have such a height that an optical path difference of about 1.25 wavelengths is provided to the light of the wavelength $\lambda_1$. The optical path difference of about 1.25 wavelengths corresponds to a phase difference of about $(2\pi+\pi/2)$. Due to the steps, an amount of phase change changes by $\pi/2$ per step as shown in FIG. 9B.

Further, due to the reason described in Embodiment 1, with respect to the light of the wavelength $\lambda_2$, an amount of phase change changes by about $-\pi/2$ per step (see FIG. 9C).

Moreover, with respect to the light of the wavelength $\lambda_3$, each step provides an optical path difference of about $-0.375$ wavelength. Due to the steps, an amount of phase change changes by about $-0.75\pi$ per step as shown in FIG. 9D.

The amount of phase change provided to the light of the wavelength $\lambda_1$ is positive, while the amounts of phase change provided to the light of the wavelengths $\lambda_2$ and $\lambda_3$ are negative. This indicates that the steps shown in FIG. 9A exert an effect which is opposite to that on the light of the wavelength $\lambda_1$, on the light of the wavelengths $\lambda_2$ and $\lambda_3$.

When the thickness of the steps increase toward the inner side of the objective lens element as shown in FIG. 9A, the optical path difference of the light of the wavelength $\lambda_1$ is lengthened toward the inner side. Meanwhile, the optical path differences of the light of the wavelengths $\lambda_2$ and $\lambda_3$ are shortened toward the inner side. When the intervals at which the phase steps are formed are designed as appropriate and the phase steps are configured to exert a convex lens effect on the light of the wavelength $\lambda_1$, a concave lens effect is exerted on red light and infrared light. Then, the focal point of the light of the wavelength $\lambda_1$ gets close to the objective lens element, while the focal points of the light of the wavelengths $\lambda_2$ and $\lambda_3$ move away from the objective lens element. Thus, the light of the wavelengths $\lambda_2$ and $\lambda_3$ can be converged on information recording surfaces through base materials thicker than the thickness $t_1$.

In the present embodiment, the steps shown in FIG. 9A are formed in a stair shape in which the height monotonically increases or decreases. Thus, the step structure in the present embodiment does not serve as a diffraction element having a periodic structure in which the height increases and decreases every certain cycle (see FIG. 23A), but serves as an element which changes a phase in a stair-like manner. In this case, a mold for molding the objective lens element can easily be produced.

Figure 10:
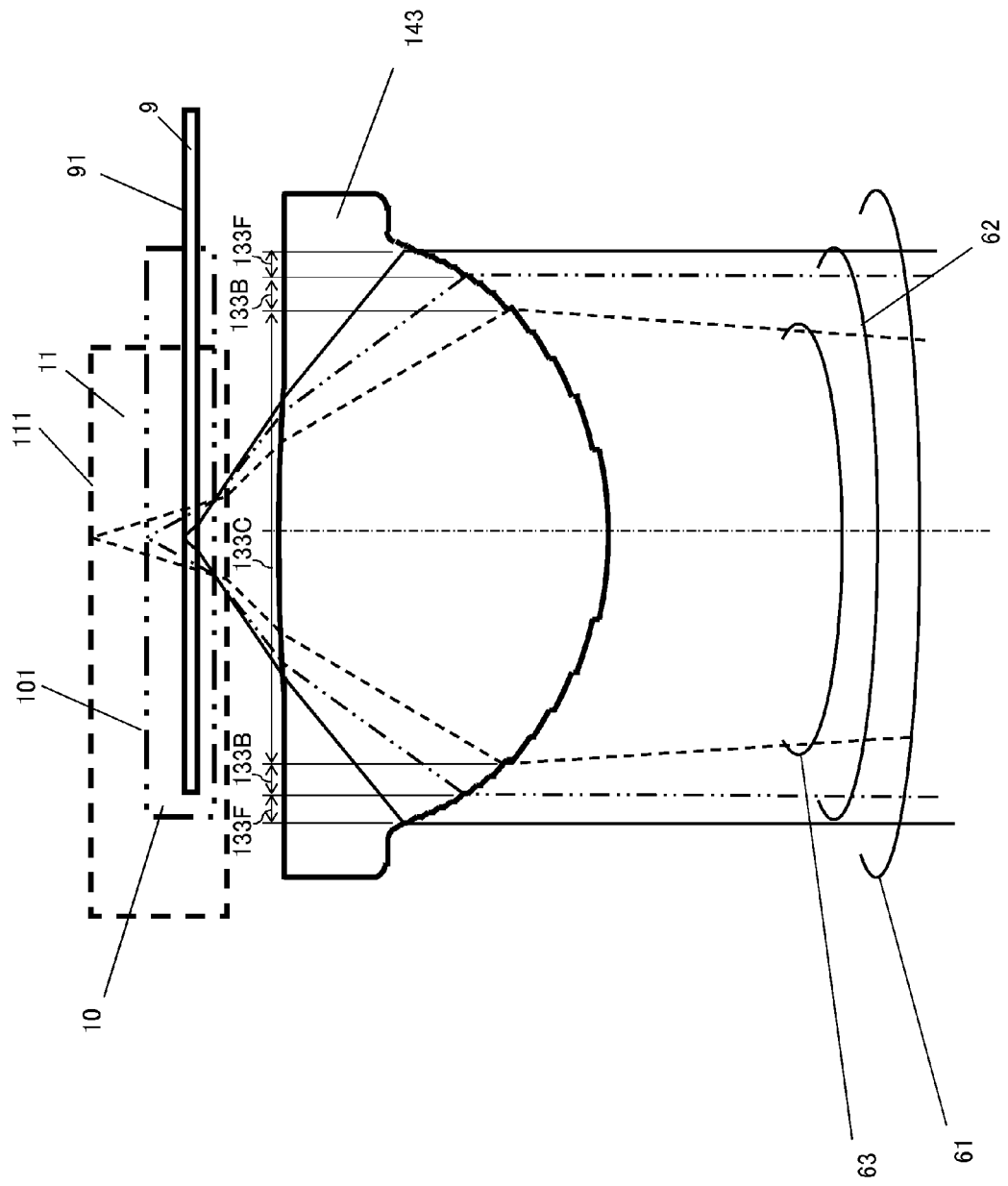
FIG. 10 is a diagram illustrating the objective lens element according to Embodiment 4.

FIG. 10 is a diagram illustrating the objective lens element according to Embodiment 4.

On at least an inner part 133C, the stair shape shown in FIG. 9A is formed. When the light of the wavelength $\lambda_1$ is used, the objective lens element 143 converges the first incident light 61 incident on the inner part 133C, an intermediate part 133B, and an outer part 133F, and forms a spot on the information recording surface 91 of the optical disc 9 through the base material having the thickness $t_1$. When the light of the wavelength $\lambda_2$ is used, the objective lens element 143 converges the second incident light 62 incident on the inner part 133C and the intermediate part 133B, and forms a spot on the information recording surface 101 of the optical disc 10 through the base material having the thickness $t_2$. When the light of the wavelength $\lambda_3$ is used, the objective lens element 143 converges third incident light 63 incident on the inner part 133C, and forms a spot on an information recording surface 111 of an optical disc 11 through the base material having the thickness $t_3$. Here, $NA_1$ is equal to or higher than 0.85, $NA_2$ is equal to or higher than 0.6, and $NA_3$ is equal to or higher than 0.45.

In other words, the inner part 133C is a region shared by the light of the wavelengths $\lambda_1$, $\lambda_2$, and $\lambda_3$, the intermediate part 133B is a region shared by the light of the wavelengths $\lambda_1$ and $\lambda_2$, and the outer part 133F is a region dedicated for the light of the wavelength $\lambda_1$. A region which is a combination of the inner part 133C and the intermediate part 133B corresponds to the inner part 131B shown in FIG. 1. The outer part 133F corresponds to the outer part 131F shown in FIG. 1. Any of the above-described exemplary configurations of the outer part can be applied to the outer part 133F.

Embodiment 5

Temperature Compensation of Resin Objective Lens Element and Compatibility with BD, DVD, and CD The present embodiment realizes compatibility with the three wavelengths as described in Embodiment 4 and suppression of a spherical aberration caused by temperature change as described in Embodiment 2, at the same time.

Figure 11:
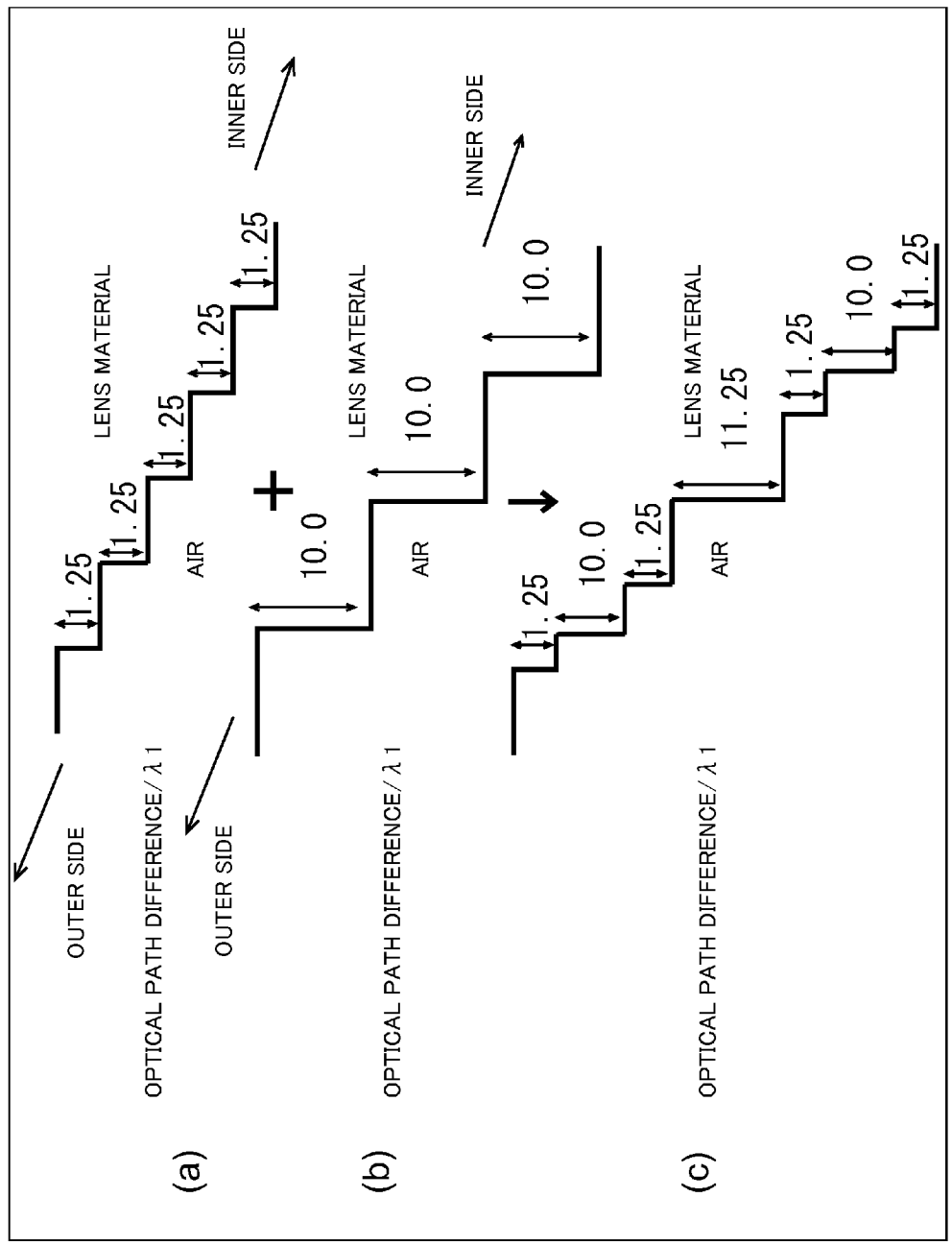
FIG. 11 is a diagram illustrating steps formed on a surface of an objective lens element according to Embodiment 5.

FIG. 11 is a diagram illustrating steps formed on a surface of an objective lens element according to Embodiment 5. Specifically, FIG. 11(a) is a diagram illustrating the physical shape of steps which realize compatibility with the wavelengths $\lambda_1$, $\lambda_2$, and $\lambda_3$. FIG. 11(b) is a diagram illustrating the physical shape of steps for suppressing a spherical aberration caused by temperature change of the resin objective lens. Each of the steps shown in FIG. 11(b) causes an optical path difference which is an integral multiple of the wavelength $\lambda_1$, at a specific environmental temperature. FIG. 11(c) is a diagram illustrating steps obtained by combining the steps of FIG. 11(a) and the steps of FIG. 11(b). The cross-sectional shape of FIG. 11(c) is formed on a base surface which is a refractive surface (aspherical shape) in the surface of the objective lens element.

In FIG. 11(b), there are differences from the steps shown in FIG. 6 (Embodiment 2) and FIG. 7(b) (Embodiment 3). The optical path difference caused by each step is an integral multiple of the wavelength $\lambda_1$ in the example of FIG. 6, and is 5N times (N is an integer other than 0) of the wavelength $\lambda_1$ in the example of FIG. 7. In FIG. 11(b), the optical path difference caused by each step is set so as to be 10M times (M is an integer other than 0) of the wavelength $\lambda_1$ as a condition. The condition is equal to limiting N to an even number, namely, N=2M, in Embodiment 3. At this time, each step of FIG. 11(b) causes an optical path difference of 6M times of wavelength to the light of the wavelength $\lambda_2$, and thus does not cause a great aberration. Further, each step of FIG. 11(b) causes an optical path difference of 5M times of wavelength to the light of the wavelength $\lambda_3$, and thus does not cause a great aberration. The compatibility with the three wavelengths is realized with the step shape shown in FIG. 11(a), and the steps shown in FIG. 11(b) are intended to suppress a spherical aberration caused by environmental temperature change when the light of the wavelength $\lambda_1$ is used. Thus, it is desirable that the steps shown in FIG. 11(b) do not cause a great aberration to the light of the wavelengths $\lambda_2$ and $\lambda_3$. Therefore, the optical path difference caused by each step of FIG. 11(b) is desirably 10M times (M is an integer other than 0) of the wavelength $\lambda_1$.

The steps shown in FIG. 11(c) preferably have a stair shape in which the height monotonically increases or decreases. In this case, a mold for molding the objective lens element can easily be produced.

Figure 12:
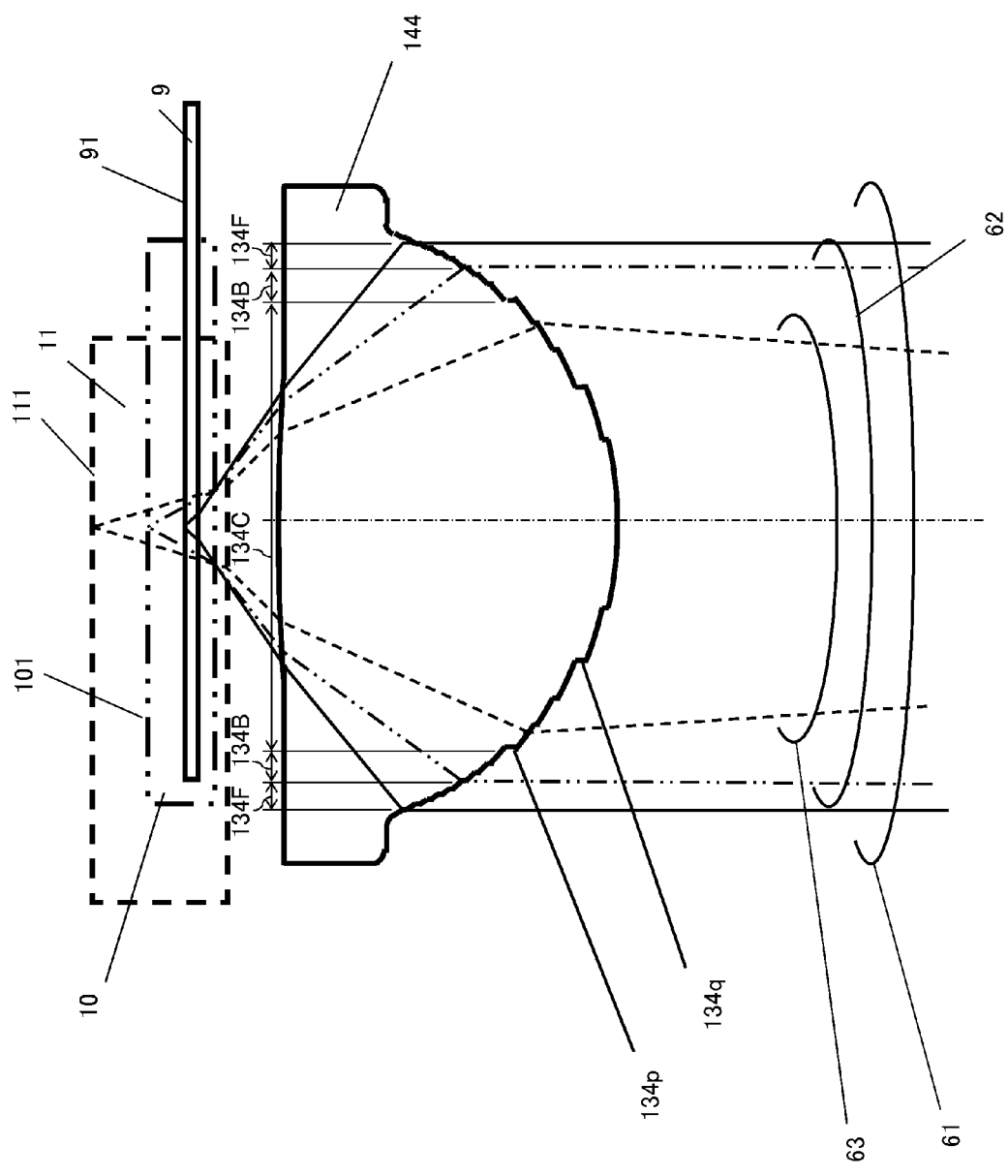
FIG. 12 is a diagram illustrating the objective lens element according to Embodiment 5.
Figure 13:
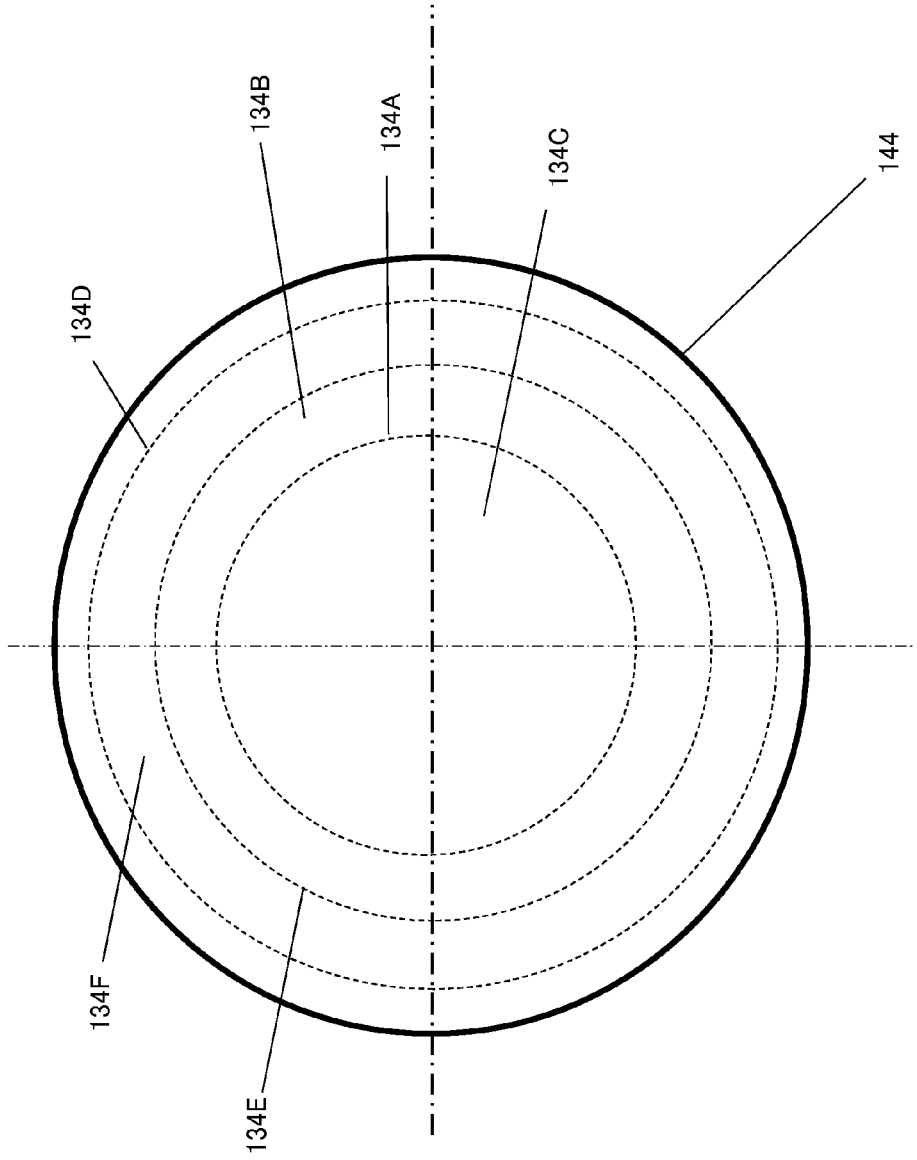
FIG. 13 is a diagram when the objective lens shown in FIG. 12 is viewed from below.

FIG. 12 is a diagram illustrating the objective lens element according to Embodiment 5. Steps 134p and 134q shown in FIG. 12 are the steps shown in FIG. 11(b). FIG. 13 is a schematic plan view when FIG. 12 is viewed from below. A region having an effective range (or an effective diameter) 134D is divided into three concentric regions, namely, an outer part 134F, an intermediate part 134B, and an inner part 134C. It should be noted that boundaries 134A, 134D, and 134E shown by broken lines in FIG. 13 are imaginary boundaries, and it is unnecessary to actually provide boundary lines thereon.

On at least the inner part 133C, the stair shape shown in FIG. 11(c) is formed. When the light of the wavelength $\lambda_1$ is used, the objective lens element 144 converges the first incident light 61 incident on the inner part 134C, the intermediate part 134B, and the outer part 134F, and forms a spot on the information recording surface 91 of the optical disc 9 through the base material having the thickness $t_1$. When the light of the wavelength $\lambda_2$ is used, the objective lens element 144 converges the second incident light 62 incident on the inner part 134C and the intermediate part 134B, and forms a spot on the information recording surface 101 of the optical disc 10 through the base material having the thickness $t_2$. When the light of the wavelength $\lambda_3$ is used, the objective lens element 144 converges the third incident light 63 incident on the inner part 133C, and forms a spot on the information recording surface 111 of the optical disc 11 through the base material having the thickness $t_3$. Here, $NA_1$ is equal to or higher than 0.85, $NA_2$ is equal to or higher than 0.6, and $NA_3$ is equal to or higher than 0.45.

In other words, the inner part 134C is a region shared by the light of the wavelengths $\lambda_1$, $\lambda_2$, and $\lambda_3$, the intermediate part 134B is a region shared by the light of the wavelengths $\lambda_1$ and $\lambda_2$, and the outer part 134F is a region dedicated for the light of the wavelength $\lambda_1$. A region which is a combination of the inner part 134C and the intermediate part 134B corresponds to the inner part 132B shown in FIG. 8. The outer part 134F corresponds to the outer part 132F shown in FIG. 8. Any of the above-described exemplary configurations of the outer part can be applied to the outer part 134F.

In the objective lens elements according to Embodiments 1 and 3 to 5 described above, the outer part is a region dedicated for the light of the wavelength $\lambda_1$, but may have an aspherical shape in which no steps are formed. Alternatively, a sawtooth-like diffraction grating may be formed on the outer part, and the sawtooth height may be set to such a height that an optical path difference of about 1 wavelength is provided to the light of the wavelength $\lambda_1$. Still alternatively, steps each having such a height that an optical path difference which is about an integral multiple of wavelength is provided to the light of the wavelength $\lambda_1$ may be formed on the outer part. Still alternatively, the height of each step formed on the outer part may be such a height that an optical path difference which is about N times (N is an integer) of wavelength is provided to the light of the wavelength $\lambda_1$. In this case, N may be an integer other than multiples of 5. When N is an integer other than multiples of 5, the wavefront of the light of the wavelength $\lambda_2$ is disturbed, and an aperture limiting effect can be obtained. When N is an odd number, the wavefront of the light of the wavelength $\lambda_3$ is disturbed, and an aperture limiting effect can be obtained. Due to such a configuration, aperture limitation can be performed such that the light of the wavelengths $\lambda_2$ and $\lambda_3$ incident on the outer part substantially does not contribute to spot formation on an information recording surface, and the numerical aperture can be set to a desired value.

Embodiment 6

Figure 14:
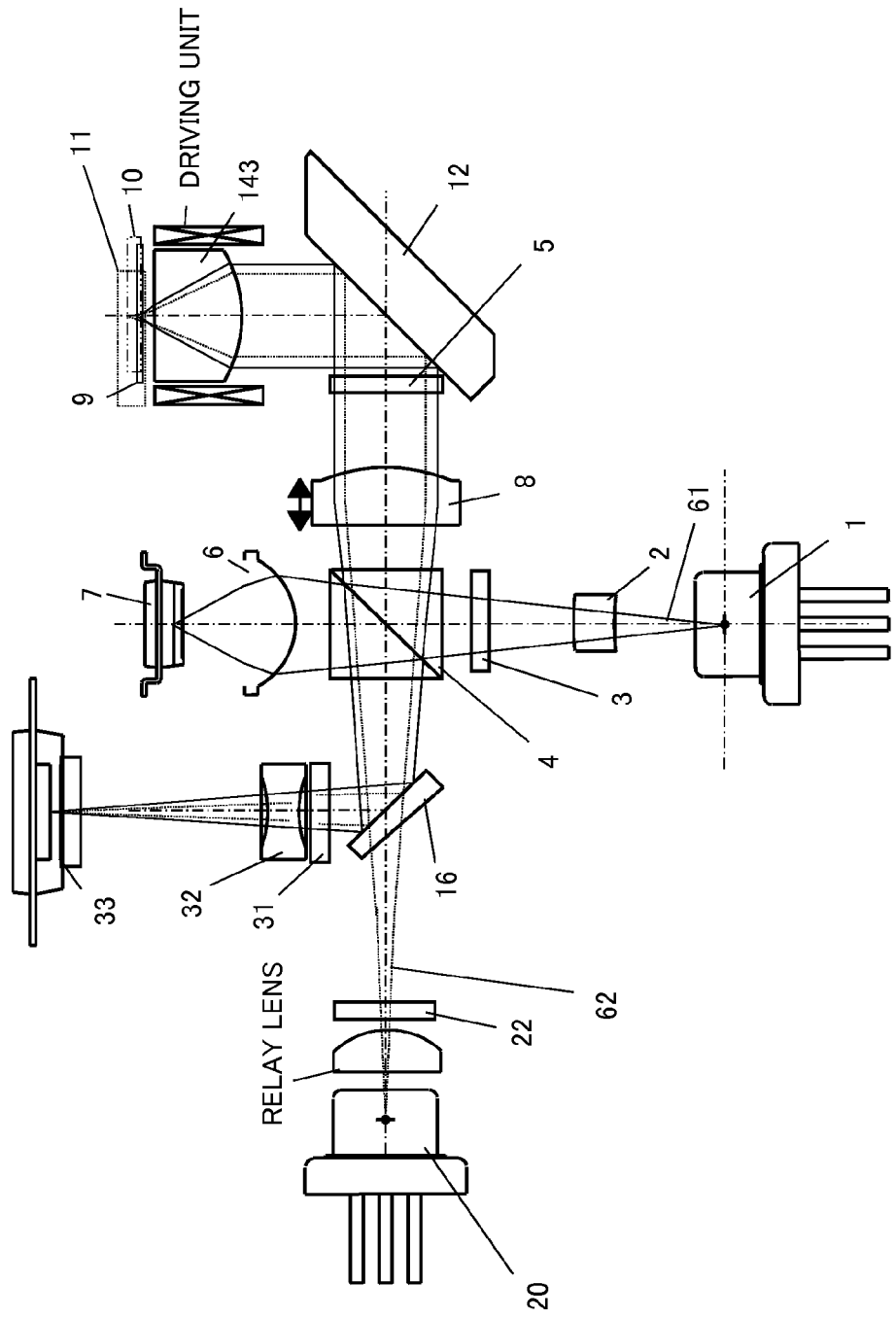
FIG. 14 is a diagram illustrating an optical head device according to Embodiment 6.

FIG. 14 is a diagram illustrating an optical head device according to Embodiment 6. The optical head device includes a laser beam source 1 which emits blue light of the wavelength $\lambda_1$ (390 nm to 415 nm: normally 408 nm), a laser beam source 20 which selectively emits red light of the wavelength $\lambda_2$ (630 nm to 680 nm: normally 660 nm) and infrared light of the wavelength $\lambda_3$ (770 nm to 810 nm: normally 780 nm), a collimating lens (first convex lens) 8, an upward reflection mirror 12 which bends an optical axis, and the objective lens element 143. The optical disc 9 is a third generation optical disc (e.g., BD) which has a base material having a thickness $t_1$ (about 0.1 mm) and on which at least one of recording, reproducing, and erasing is performed with a light beam of the wavelength $\lambda_1$. The optical disc 10 is a second generation optical disc (e.g., DVD) which has a base material having a thickness $t_2$ (about 0.6 mm) and on which at least one of recording, reproducing, and erasing is performed with a light beam of the wavelength $\lambda_2$. The optical disc 11 is a first generation optical disc (e.g., CD) which has a base material having a thickness $t_3$ (about 1.2 mm) and on which at least one of recording, reproducing, and erasing is performed with a light beam of the wavelength $\lambda_3$. In FIG. 14, only the base materials (portions from light incident surfaces to recording surfaces) of the optical discs 9 and 10 are shown. In reality, each of the optical discs 9 and 10 is attached to a protective material in order to reinforce mechanical strength and to have a thickness of 1.2 mm which is the same as the thickness of CD. The optical disc 10 is attached to a protective material having a thickness of 0.6 mm, and the optical disc 9 is attached to a protective material having a thickness of 1.1 mm. The optical disc 11 also has a thin protective material, but illustration of the protective materials is omitted for simplification.

In the present embodiment, the configuration employing the two-wavelength laser beam source 20 which emits the light of the wavelengths $\lambda_2$ and $\lambda_3$ is shown. However, a configuration in which different light sources are employed for these wavelengths, respectively and optical paths are combined by using a dichroic mirror is also possible.

The laser beam sources 1 and 20 are preferably semiconductor laser sources. When semiconductor laser sources are used, the optical head device and an optical disc recording/reproducing apparatus employing this optical head device can be decreased in size, weight, and power consumption.

When any of recording, reproducing, and erasing is performed on the highest-recording density optical disc 9, a light beam 61 of the wavelength $\lambda_1$ emitted from the laser beam source 1 is reflected by a beam splitter 4, is converted by the collimating lens 8 into substantially parallel light, and is further converted by a quarter wavelength plate 5 into polarized light. The quarter wavelength plate 5 is designed to serve as a quarter wavelength plate for the light of both wavelengths $\lambda_1$ and $\lambda_2$. The light emitted from the quarter wavelength plate 5 is bent by the upward reflection mirror 12, and is converged by the objective lens element 143 on the information recording surface 91 through the base material of the optical disc 9. Here, for convenience of illustration, the upward reflection mirror 12 is shown to bend the light beam in the upward direction of the drawing. However, in reality, the upward reflection mirror 12 is disposed so as to bend the light beam optical axis in a direction perpendicular to the sheet.

The light beam reflected by the information recording surface travels along the optical path in the reverse direction, is converted by the quarter wavelength plate 5 into linearly polarized light having a polarization plane different from an initial polarization plane, almost totally passes through the beam splitter 4, and is totally reflected by a beam splitter 16. The light beam reflected by the beam splitter 16 is diffracted by a detection diffraction element 31, then is converged by a detection lens 32, and is incident on a photodetector 33. Output of the photodetector 33 is subjected to arithmetic processing to obtain a servo signal and an information signal which are used for focus control and tracking control. The beam splitter 4 includes a polarization splitting film which totally reflects linearly polarized light of the wavelength $\lambda_1$ having a certain direction and totally passes linearly polarized light of the wavelength $\lambda_1$ having a direction orthogonal to the certain direction. The polarization splitting film totally passes light beams of the wavelengths $\lambda_2$, and $\lambda_3$. As described above, the beam splitter 4 is an optical path branching element which has polarization properties as well as wavelength selectivity. When the beam splitter 4 has no polarization dependency, it is possible to omit the quarter wavelength plate 5.

Next, when any of recording, reproducing, and erasing is performed on the optical disc 10, a light beam 62 of the wavelength $\lambda_2$ which is emitted from the laser beam source 20 and is substantially linearly polarized light passes through the beam splitter 16 and the beam splitter 4 and is converted by the collimating lens 8 into substantially parallel light. The light beam emitted from the collimating lens 8 is bent by the upward reflection mirror 12 and is converged by the objective lens element 143 on the information recording surface 101 of the optical disc 10.

The light beam reflected by the information recording surface travels along the optical path in the reverse direction, almost totally passes through the beam splitter 4, and is totally reflected by the beam splitter 16. The light beam reflected by the beam splitter 16 is diffracted by the detection diffraction element 31, then is converged by the detection lens 32, and is incident on the photodetector 33. Output of the photodetector 33 is subjected to arithmetic processing to obtain a servo signal and an information signal which are used for focus control and tracking control. In order to obtain a servo signal for the optical disc 9 and a servo signal for the optical disc 10 by using the photodetector 33 shared by the wavelengths $\lambda_1$ and $\lambda_2$, the light-emitting point of the laser beam source 1 and the light-emitting point (the light of the wavelength $\lambda_2$) of the laser beam source 20 are located in a construct-image relation with respect to a common position on the objective lens element 143 side. When such a configuration is provided, the number of detectors and the number of wires can be reduced.

The beam splitter 16 includes a polarization splitting film which totally passes linearly polarized light of the wavelength $\lambda_2$ having a certain direction and totally reflects linearly polarized light having a direction orthogonal to the certain direction. The polarization splitting film totally passes a light beam of the wavelength $\lambda_1$. As described above, the beam splitter 16 is also an optical path branching element which has polarization properties as well as wavelength selectivity. When the beam splitter 16 has no polarization dependency, it is possible to omit the quarter wavelength plate 5.

The operation of each component and the optical path when any of recording, reproducing, and erasing is performed on the optical disc 11 are the same as those in the case of the optical disc 10, except that the wavelength of the light emitted from the laser beam source 20 is different. Thus, the repeated description is omitted.

In the example of FIG. 14, in the objective optical system, the objective lens element 143 described in Embodiment 4 is used, but the objective lens element 144 according to Embodiment 5 may be used.

In the objective optical system, the objective lens element 141 according to the Embodiment 1 or the objective lens element 142 according to Embodiment 3 may be used. In this case, a light source which emits only light of the wavelength $\lambda_2$ can be used instead of the laser beam source 20, and an optical head device which enables compatibility with the optical disc 9 and the optical disc 10 can be configured.

Further, in the objective optical system, the objective lens element according to Embodiment 2 may be used. In this case, an optical head device dedicated for the optical disc 9 can be configured without providing the laser beam source 20. Alternatively, an optical head device may be configured by combining the objective lens element according to Embodiment 2 and an objective lens element which enables compatibility with light of the wavelengths $\lambda_2$ and $\lambda_3$.

Additional components of the optical head device will be described below.

A three-beam grating (diffraction element) 3 may be disposed between the laser beam source 1 and the beam splitter 4. Due to this configuration, it is possible to detect a tracking error signal of the optical disc 9 by the well-known differential push-pull (DPP) method.

A relay lens 2 may be disposed between the laser beam source 1 and the beam splitter 4. Due to this configuration, the numerical aperture on the collimating lens 8 side of the light beam 61 of the wavelength $\lambda_1$ can be set to an appropriate value.

A three-beam grating (diffraction element) 22 may be disposed between the laser beam source 20 and the beam splitter 16. Due to this configuration, it is possible to detect a tracking error signal of the optical disc 10 by the well-known differential push-pull (DPP) method.

It is effective to change the parallelism of the light beam by moving the collimating lens 8 along the optical axis direction (the right-left direction in FIG. 14). There are errors in the thicknesses of the base materials. In addition, when the optical disc 9 is a multilayer disc, a base material having a predetermined thickness is provided between recording layers. A spherical aberration occurs due to an error of the base material thickness and the base material between the recording layers, but can be compensated by moving the collimating lens 8 along the optical axis direction.

Spherical aberration compensation performed by moving the collimating lens 8 is possible with about several hundreds m$\lambda$ when the NA is 0.85, and a spherical aberration corresponding to increase/decrease of ±30 μm in base material thickness can also be compensated. In addition, when recording, reproducing, or erasing is performed on the optical disc 11 by using the light beam of the wavelength $\lambda_3$, the collimating lens 8 may be moved toward the left side of FIG. 14, namely, toward the laser beam source 20. In this case, the collimating lens 8 converts a light beam travelling toward the objective lens element 143, into diverging light, can move a convergence spot on the optical disc 11 further away from the objective lens element 143, and can compensate a part of an aberration caused by the base material thickness. When the part of the aberration is compensated by the collimating lens 8, an aberration compensation amount required for the objective lens element 143 can be reduced. In addition, the number of formed steps can be reduced and hence it can be made easy to produce the objective lens element 143.

The beam splitter 4 may pass a portion (e.g., about 10%) of the linearly polarized light of the wavelength $\lambda_1$ emitted from the laser beam source 1. The passed portion of the light beam is guided by a converging lens 6 to a photodetector 7. A signal obtained from the photodetector 7 is used to monitor change in amount of the light emitted by the laser beam source 1, and the change in amount of the light is fed back, whereby control can be performed to keep the amount of the light emitted by the laser beam source 1, constant.

The beam splitter 4 may reflect a portion (e.g., about 10%) of the linearly polarized light emitted from the laser beam source 20. The reflected light beam is guided by the converging lens 6 to the photodetector 7. A signal obtained from the photodetector 7 is used to monitor change in amount of the light emitted by the laser beam source 20, and the change in amount of the light is fed back, whereby control can be performed to keep the amount of the light emitted by the laser beam source 20, constant.

Embodiment 7

Figure 15:
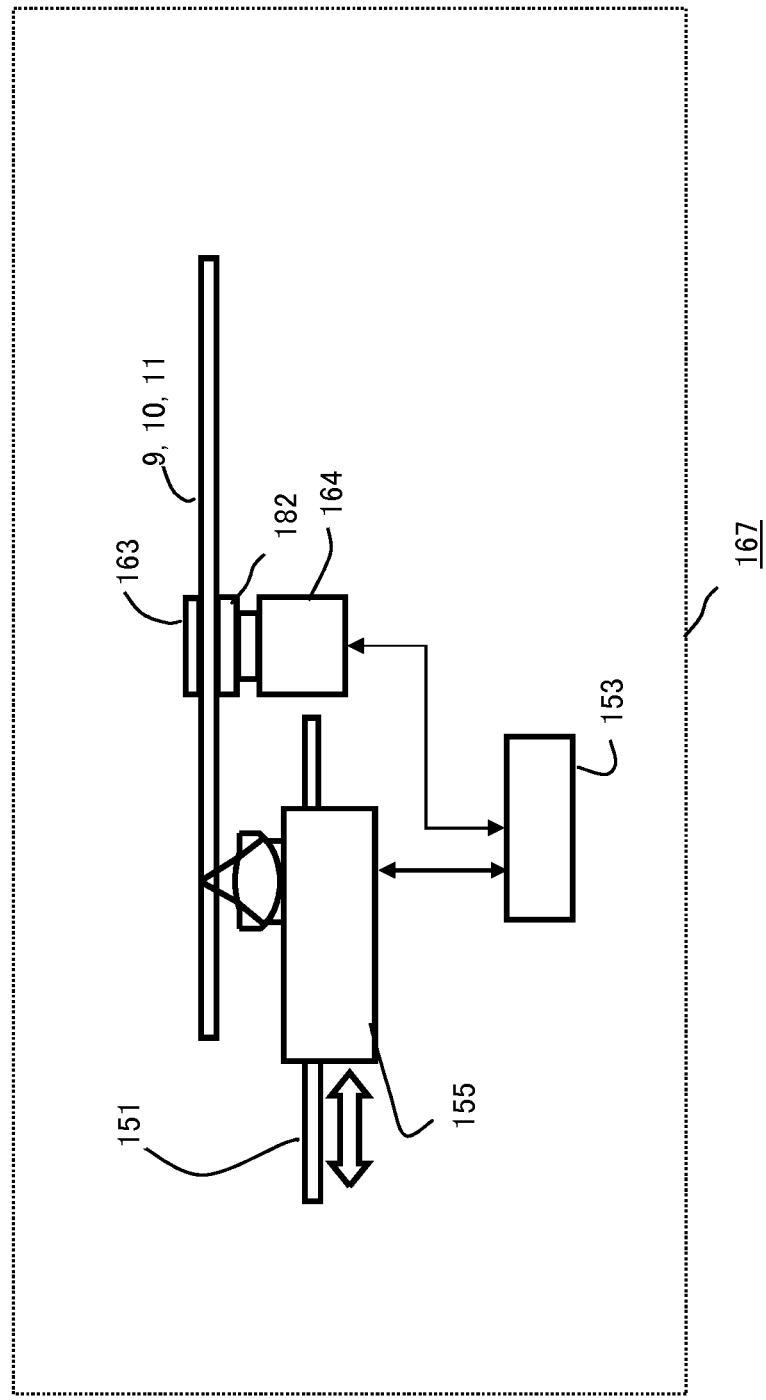
FIG. 15 is a diagram illustrating an optical information apparatus according to Embodiment 7.

FIG. 15 is a diagram illustrating an optical information apparatus according to Embodiment 7.

The optical disc 9 is retained on a turntable 182 by a clamper 163 and is rotated by a motor 164 (the same applies to the optical discs 10 and 11). An optical head device 155 is the optical head device described in Embodiment 6 and includes any of the objective lens elements described in Embodiments 1 to 5. The optical head device 155 is driven by a drive unit 151 to a position which faces a desired track on the optical disc 9 (10, 11).

The optical head device 155 detects a positional relationship with the optical disc 9 and outputs a focus error signal or a tracking error signal to an electric circuit 153. In response to the signal, the electric circuit 153 sends a signal for finely adjusting the position of the objective lens element. On the basis of the output signal from the electric circuit 153, the optical head device 155 performs focus control or tracking control and performs recording, reproducing, or erasing of information.

The optical information apparatus 167 according to the present embodiment employs the optical head device 155 described in Embodiment 6, and thus is compatible with a plurality of optical discs having different recording densities. Therefore, the optical information apparatus 167 can be configured to be small in size and weight at low cost.

Embodiment 8

Figure 16:
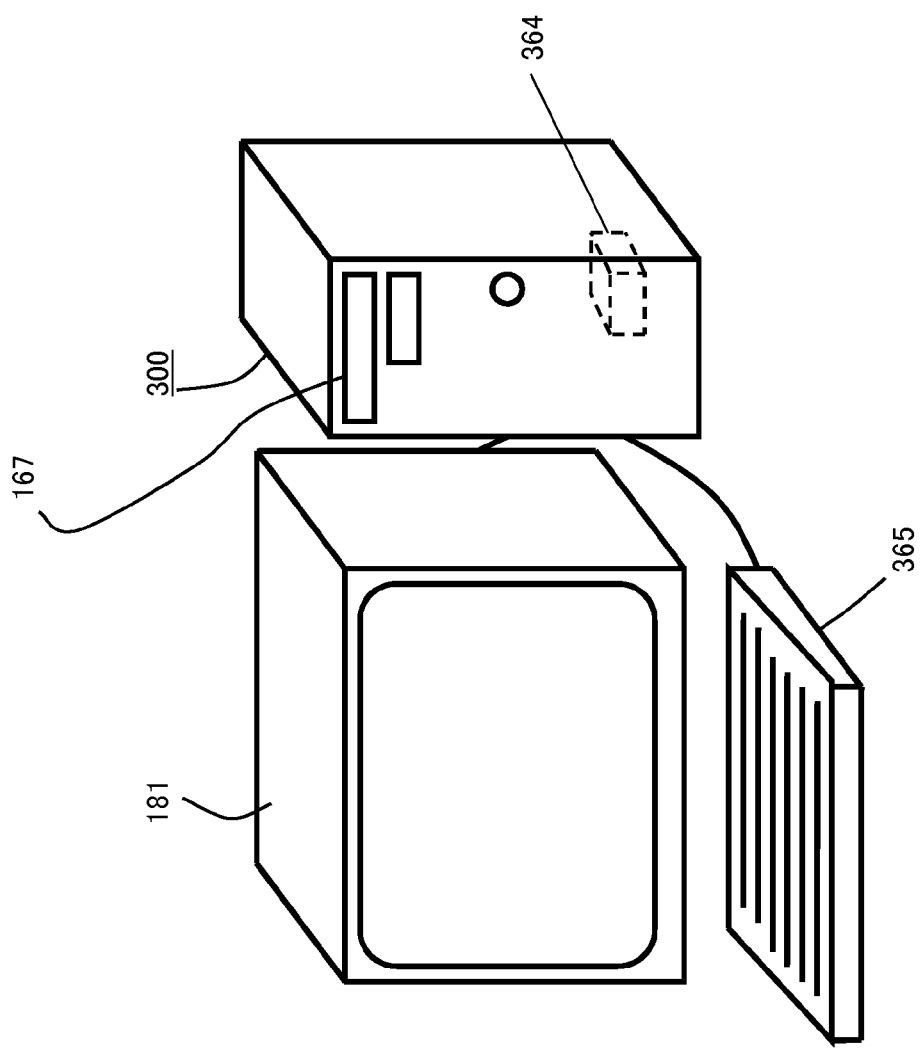
FIG. 16 is a diagram illustrating a computer according to Embodiment 8.

FIG. 16 is a diagram illustrating a computer according to Embodiment 8.

The computer 300 includes the optical information apparatus 167 according to Embodiment 7, an arithmetical unit 364 such as a central processing unit (CPU). The computer 300 is connected to an input device 365 for performing input of information, such as a keyboard, a mouse, and a touch panel, and an output device 181 such as a printer and a display device displaying information. The computer 300 performs an operation on the basis of information inputted through the input device 365, information read out from an optical disc through the optical information apparatus 167, or the like, and outputs the result of the operation to the output device 181.

Embodiment 9

Figure 17:
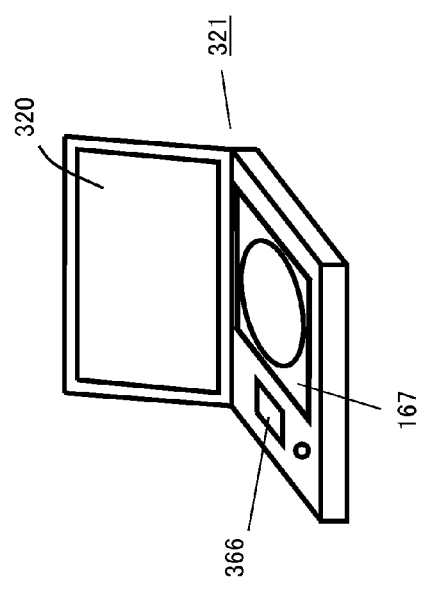
FIG. 17 is a diagram illustrating an optical disc player according to Embodiment 9.

FIG. 17 is a diagram illustrating an optical disc player according to Embodiment 9.

The optical disc player 321 includes the optical information apparatus 167 according to Embodiment 7, a decoder 366 which converts an information signal obtained from the optical information apparatus 167 into image information, and a liquid crystal monitor 320. The optical disc player 321 can also be used as a car navigation system. Alternatively, an optical disc player which does not include a liquid crystal monitor may be configured.

Embodiment 10

Figure 18:
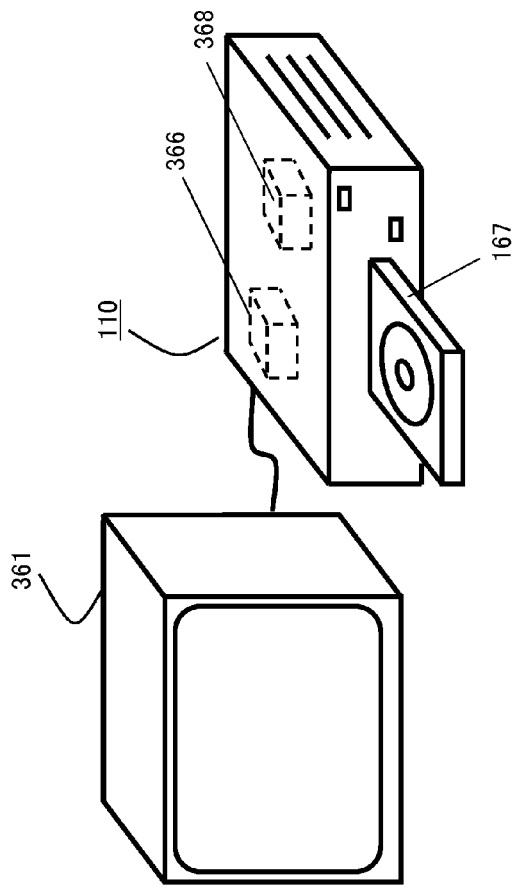
FIG. 18 is a diagram illustrating an optical disc recorder according to Embodiment 10.

FIG. 18 is a diagram illustrating an optical disc recorder according to Embodiment 10.

The optical disc recorder 110 includes the optical information apparatus 167 according to Embodiment 7 and an encoder 368 which converts image information into information for recording. The optical disc recorder 110 preferably further includes the decoder 366 which converts an information signal obtained from the optical information apparatus 167 into image information. By providing the decoder 366 and the encoder 368, the optical disc recorder 110 can be configured to be able to perform both recording and reproducing. In FIG. 18, the optical disc recorder 110 is connected to an output device 361 such as a display device and a printer, but may be integrated with the output device 361.

Embodiment 11

Figure 19:
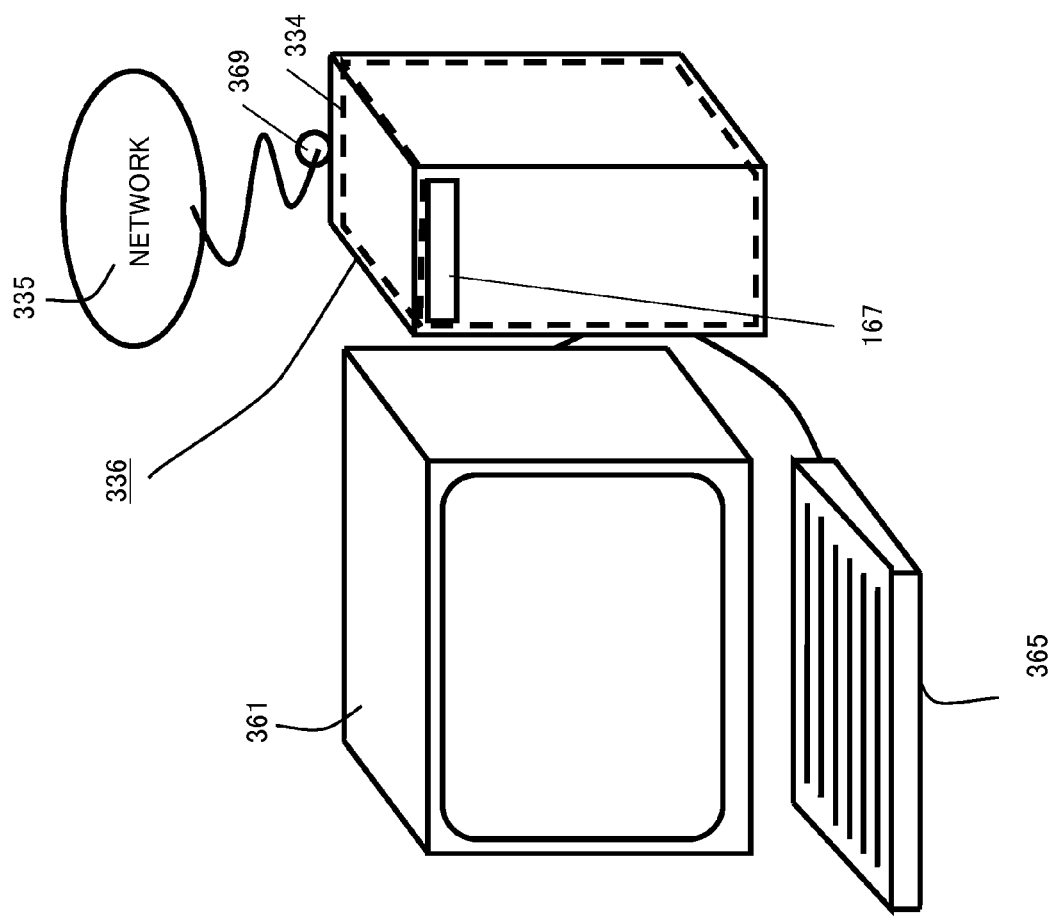
FIG. 19 is a diagram illustrating an information server according to Embodiment 11.

FIG. 19 is a diagram illustrating an information server according to Embodiment 11.

The information server 336 includes the optical information apparatus 167 according to Embodiment 7, a changer 334 which accommodates a plurality of optical discs and inserts an optical disc into the optical information apparatus 167 or takes out an optical disc from the optical information apparatus 167, and an input/output terminal 369. The input/output terminal 369 is a wired or wireless interface used for introducing information to be recorded on an optical disc and outputting information read from an optical disc to the outside. The information server 336 is connected to a network or another apparatus (e.g., a computer, a phone, or a television tuner) via the input/output terminal 369, and can exchange information therewith. The information server 336 may be connected to the output device 361 such as a display device and a printer. Alternatively, the information server 336 may not necessarily include the changer.

Embodiment 12

Figure 20:
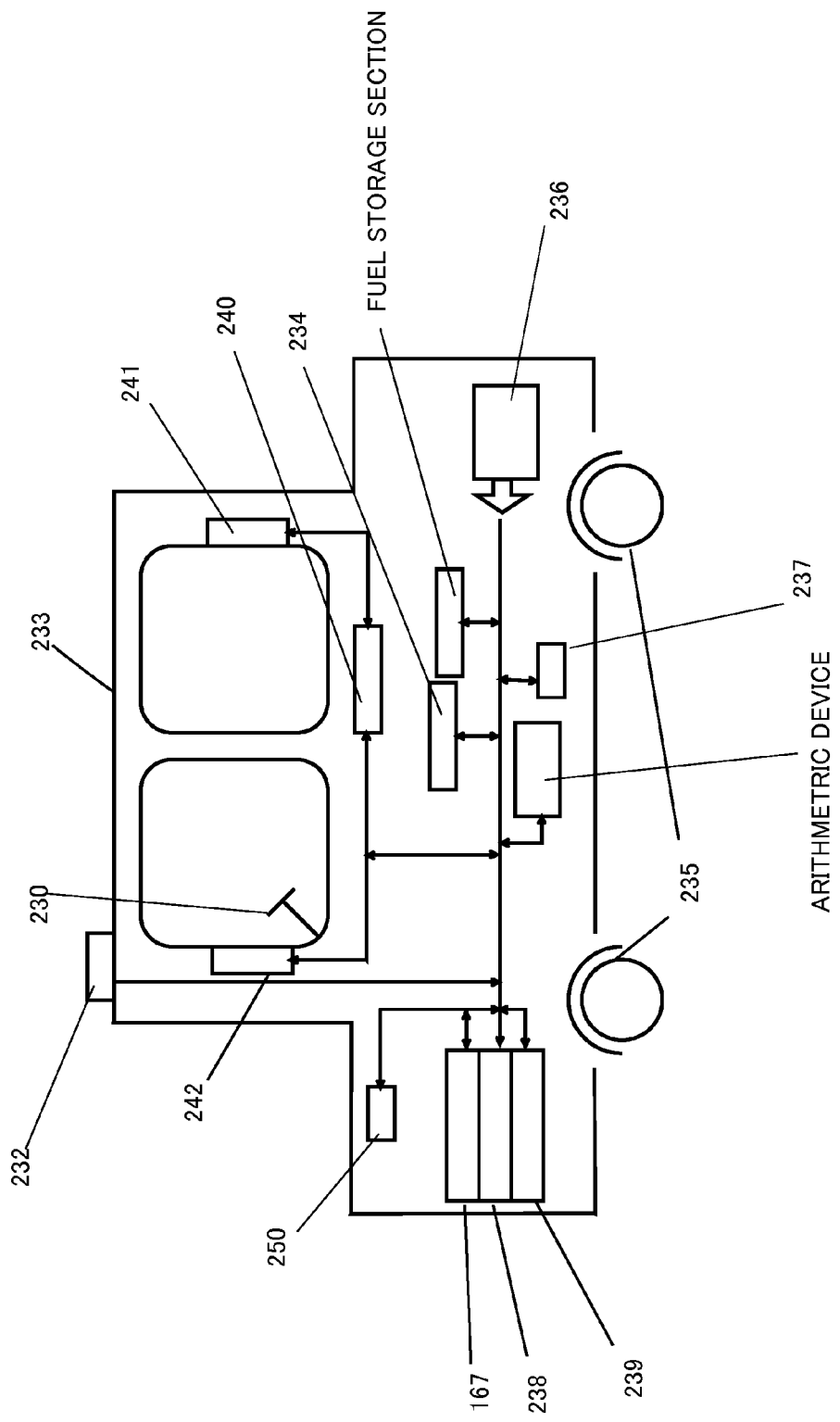
FIG. 20 is a diagram illustrating a vehicle according to Embodiment 12.
Figure 21:
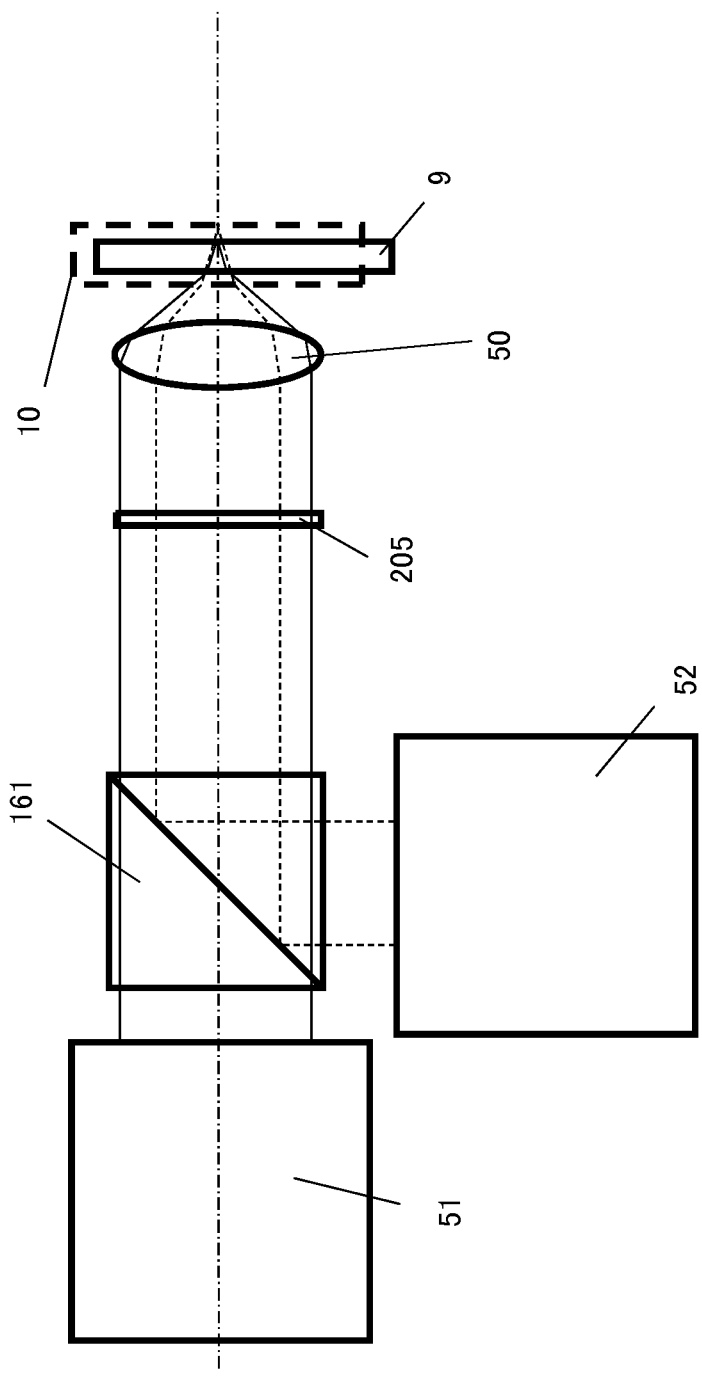
FIG. 21 is a diagram illustrating a schematic configuration of a conventional optical head device.
Figure 22A:
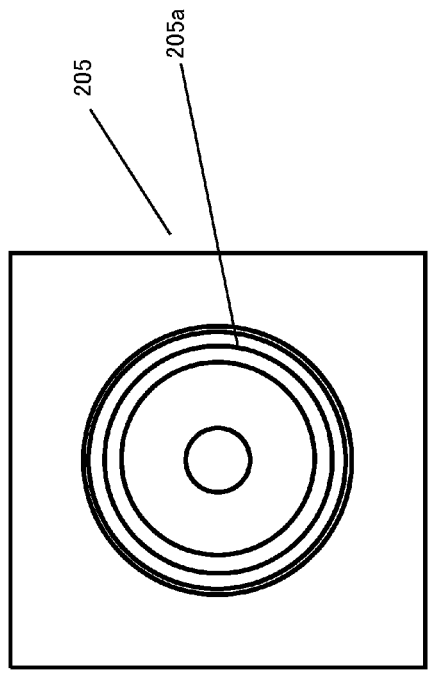
FIG. 22A is a plan view of an optical element shown in FIG. 21.
Figure 22B:
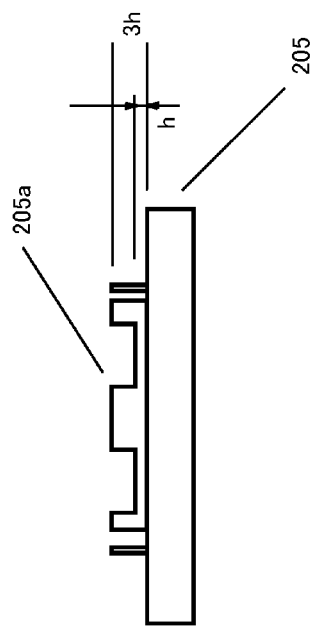
FIG. 22B is a cross-sectional view of the optical element shown in FIG. 21.

FIG. 20 is a diagram illustrating a vehicle according to Embodiment 12.

The vehicle shown in FIG. 20 includes a body 233, the optical information apparatus 167 according to Embodiment 7, an accommodation section 239 which accommodates a plurality of optical discs, and a changer 238 which inserts an optical disc into the optical information apparatus 167 or takes out an optical disc from the optical information apparatus 167. On the body 233, a power generation section 234 which generates power, a fuel storage section which stores a fuel supplied to the power generation section 234, and a power source 236 are mounted. In the case of a train or an automobile, the vehicle further includes wheels 235 for running. In addition, when the vehicle is an automobile, the vehicle includes a steering wheel 230.

Since the vehicle according to the present embodiment includes the changer 238 and the optical disc accommodation section 239, many optical discs can readily be used. When an arithmetical unit 364 which processes information obtained from an optical disc to convert the information into an image, a semiconductor memory 237 which temporarily stores information, and a display device 242 are mounted on the body 233, it is possible to reproduce video information recorded on an optical disc. In addition, when an amplifier 240 and a speaker 241 are provided in the body 233, it is possible to reproduce sound or music recorded on an optical disc. When a position sensor such as a GPS 232 is provided, a current position or a travelling direction can be displayed as an image on the display device 242 in combination with map information reproduced from an optical disc, or can be outputted as sound from the speaker 241. When a wireless communication section 250 is provided, information can be obtained from the outside and used with information of an optical disc in a complementary manner.

The present invention can be used in a BD/DVD-compatible or BD/DVD/CD-compatible optical head device.

While the invention has been described in detail, the foregoing description is in all aspects illustrative and not restrictive. It will be understood that numerous other modifications and variations can be devised without departing from the scope of the invention.

What is claimed is:

1. An objective lens element which has optically functional surfaces on an incident side and an exit side, which converges a first incident light beam of a wavelength $\lambda_1$ through a base plate having a thickness $t_1$ to form a spot, and which converges a second incident light beam of a wavelength $\lambda_2$ longer than the wavelength $\lambda_1$ through a base plate having a thickness $t_2$ larger than the thickness $t_1$ to form a spot, wherein at least either one of the optical function surfaces is a refractive surface which deflects the first and second incident light beams by refractive power all over the surface, the at least either one of the optical function surfaces being divided into an inner part which includes a rotational symmetry axis and through which the first and second incident light beams that substantially contribute to spot formation pass, and an outer part which is a ring-shaped region surrounding the inner part and through which only the first incident light beam that substantially contributes to spot formation passes, and the at least either one of the optical function surfaces having a plurality of discontinuous steps, each of the plurality of steps causes an optical path difference which is an integral multiple of the wavelength $\lambda_1$, to the first incident light beam at a predetermined environmental temperature, and when an environmental temperature changes, tendency of spherical aberration change caused by change in shape of the refractive surface is opposite to tendency of spherical aberration change caused by change in optical path difference provided by the steps, the change in optical path difference being caused by based on change in refractive index.

2. The objective lens element according to claim 1, wherein each step on the inner part provides an optical path difference which is an integral multiple of about 5 wavelengths, to light of the wavelength $\lambda_1$ at the predetermined environmental temperature.

3. The objective lens element according to claim 2, wherein each step on the innermost portion of the inner part provides an optical path difference which is an integral multiple of about 10 wavelengths, to the light of the wavelength $\lambda_1$ at the predetermined environmental temperature.

4. The objective lens element according to claim 1, wherein an amount of change in 3rd order spherical aberration per change of 30° C. in the environmental temperature is equal to or less than 60 m$\lambda$, and an amount of change in 5th spherical aberration per change of 30° C. in the environmental temperature is equal to or less than 30 m$\lambda$.

5. The objective lens element according to claim 1, wherein the outer part has an aspherical shape in which no steps are formed.

6. The objective lens element according to claim 1, wherein a diffraction grating having a sawtooth shape is formed on the outer part, and the sawtooth shape has such a height that an optical path difference of about 1 wavelength is provided to light of the wavelength $\lambda_1$.

7. The objective lens element according to claim 1, wherein steps each having such a height that an optical path difference which is substantially an integral multiple of wavelength $\lambda_1$ is provided to light of the wavelength $\lambda_1$ are formed on the outer part.

8. The objective lens element according to claim 7, wherein each step on the outermost portion of the outer part has such a height that an optical path difference which is substantially N times (N is an integer other than multiples of 5) of wavelength $\lambda_1$ is provided to the light of the wavelength $\lambda_1$.

* * * * *